(12) United States Patent
Kowald

(10) Patent No.: US 7,362,946 B1
(45) Date of Patent: Apr. 22, 2008

(54) AUTOMATED VISUAL IMAGE EDITING SYSTEM

(75) Inventor: Julie Rae Kowald, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/543,330

(22) Filed: Apr. 5, 2000

(30) Foreign Application Priority Data

| Apr. 12, 1999 | (AU) | ................................... PP9704 |
| Apr. 12, 1999 | (AU) | ................................... PP9705 |
| Apr. 12, 1999 | (AU) | ................................... PP9706 |

(51) Int. Cl.
*H04N 5/93* (2006.01)

(52) U.S. Cl. .................... 386/52; 386/46; 386/125; 360/13; 369/83

(58) Field of Classification Search .............. 386/52, 386/54–55, 46, 83, 126, 95, 111, 117, 125; 360/13; 369/83; 348/239, 515, 231.5, 231.3
See application file for complete search history.

(56) References Cited

U.S. PATENT DOCUMENTS

| 5,012,334 | A |   | 4/1991  | Etra ............................ 358/102 |
| 5,436,653 | A | * | 7/1995  | Ellis et al. ..................... 725/22 |
| 5,515,101 | A | * | 5/1996  | Yoshida ....................... 348/239 |
| 5,589,945 | A | * | 12/1996 | Abecassis ..................... 386/83 |
| 5,696,866 | A | * | 12/1997 | Iggulden et al. .............. 386/46 |
| 5,737,476 | A | * | 4/1998  | Kim ............................. 386/52 |
| 5,784,521 | A | * | 7/1998  | Nakatani et al. .............. 386/46 |
| 5,841,740 | A | * | 11/1998 | Fijita et al. ................. 386/126 |
| 5,937,136 | A |   | 8/1999  | Sato ............................. 386/52 |
| 5,956,453 | A | * | 9/1999  | Yaegashi et al. ............... 386/52 |
| 5,969,716 | A | * | 10/1999 | Davis et al. ................. 345/726 |
| 5,982,447 | A | * | 11/1999 | Nakamura ................... 348/515 |
| 5,999,689 | A | * | 12/1999 | Iggulden ....................... 386/46 |
| 6,034,679 | A |   | 3/2000  | McGrath ..................... 345/328 |
| 6,137,945 | A | * | 10/2000 | McGrath ....................... 386/52 |
| 6,256,451 | B1| * | 7/2001  | Mitsui ........................ 386/52 |
| 6,263,149 | B1| * | 7/2001  | Persoon ....................... 386/52 |
| 6,292,620 | B1| * | 9/2001  | Ohmori et al. ................ 386/55 |
| 6,334,022 | B1| * | 12/2001 | Ohba et al. ................... 386/46 |
| 6,341,192 | B1| * | 1/2002  | Fujinami ..................... 386/52 |
| 6,449,422 | B1| * | 9/2002  | Ebisawa ...................... 386/52 |
| 6,546,187 | B1| * | 4/2003  | Miyazaki et al. ............. 386/52 |

\* cited by examiner

*Primary Examiner*—John Miller
*Assistant Examiner*—Christopher Onuaku
(74) *Attorney, Agent, or Firm*—Fitzpatrick, Cella, Harper & Scinto

(57) ABSTRACT

A method of editing a video sequence comprising a series of clips, in which each clip is formed by video content captured between two points in time. Duration data associated with the duration of each clip is extracted from the sequence. The duration data is processed according to at least one predetermined template of editing rules to form editing instruction data, the template indicating a plurality of predetermined edited segment durations, and the editing instruction data being configured to form output edited segments from the clips The clip is then processed (edited) according to the editing instruction data to form an output edited sequence of output edited segments. Each of the output edited segments has a duration corresponding to one of the predetermined edited segment durations with at least a portion of the clip being discarded by the processing of the clip.

71 Claims, 11 Drawing Sheets

AUTOMATED VISUAL IMAGE EDITING SYSTEM

FIELD OF THE INVENTION

The present invention relates to the editing of raw motion picture footage and, in particular, to the extraction of information from a sequence of image clips obtained from film or video image information to facilitate editing of the raw footage to provide a desired result. Specific implementations are concerned with the automated editing of the source image materials to provide a rhythmic sequence of clips that captures the essence of the raw footage whilst reducing the playback time so as to avoid reproduction of portions of footage likely to be of little interest, and also to the identification of significant events in the footage, the placement of titles, and to the extraction of a series of individual frames for printing which are representative of the original footage.

BACKGROUND

The creation of smooth, rhythmic edited results from raw video or film stock requires specialised skill in order to produce interesting and entertaining results. When dealing with film, typically the film stock is converted into a video format so that the sequence of images can be readily manipulated with computerised assistance. Once the specific sequence is finalised using video editing, the original film stock may be cut and spliced in the traditional fashion thereby ensuring high quality reproduction. Such a process therefore relates to the manipulation of video (either analog or digital-based) which requires skills in a number of areas including digital film effects, editing and sound design. Such skills are rarely possessed by one person and each take advanced training sometimes only ever achieved from years of working in the film production industry.

Amateur video makers rarely have the time, expertise and sophisticated equipment necessary to achieve the results a professional film maker might obtain given comparable source material. The amateur results are, in most cases, only subjectively interesting to participants of the video, and often the interest of non-participant audiences are found to wane early in the screening. Such a lack of interest, in many cases arises from the poor application of editing techniques that can otherwise turn somewhat "ordinary" original footage into an entertaining final edited version. Basic editing and production techniques commonly used by professionals that are missing from amateur video include incorporation of attractive titles, a rhythmic approach to editing, the appropriate use of transitions and cuts, sound and backing tracks and also the application of digital effects such as colour correction, and particle animations, and also the application of different shot types.

The editing of original footage requires placing clips in a sequence corresponding to the order in which they were originally derived. Current tools available to amateurs and professionals alike include software that may operate on personal computers (PC's), with or without a video card, and which is configured to manage a linear time line for editing purposes. Hardware such as dual video cassette recorders (VCR's) may be used to allow sequencing from the original source tape to a new tape. Editing by either method is a time consuming task, as both solutions require a "hands on" approach of manually slotting each clip into its place in the sequence. Transitions such as dissolves or cross-fades must also be placed manually and often impose heavy processing demands on computer aided production devices. Also, the correct understanding of transitions and where they should be used is often lacking with respect to the amateur video maker, and often results in inappropriate or excessive use or the draining of resources from the production system, only to achieve an unprofessional result. The current dual VCR approach is fraught with problems. For example, should the amateur wish to amend any part of the video after editing is completed, the entire process must be re-performed.

The placement of titles in the edited video must also be done by first analysing the footage to determine new scene locations. This task requires some time relative to the amount of footage the video maker has available, as the footage must be carefully reviewed with in-out points recorded, and then further time is required for the title mattes to be inserted. To achieve an optimal result, alternate transitions to the rest of the video must be inserted when a new scene is introduced.

Insert titles, or "intertitles" as they are sometimes known, have been used historically in the production of silent movies to help convey information about characters and the story to the audience in the absence of sound. Insert titles are also used in modern day productions to facilitate comments on action, create humor, set time and location and provide for continuity between otherwise disparate scenes. The current method of producing insert titles has been performed by a person known as a typesetter who is given the written content by a writer of the movie or production. The typesetter is a skilled person who sets out the text either photographically, illustrated by hand or with the use of a desktop publishing system. Words are supplied in most cases by a writer who knows the context of the story and are often written in witty prose or, if conveying the setting of location or time, is generally direct and informative. Insert titles are incorporated into a short list for the editor to then sequence the titles into a movie. The duration of insert titles is largely set according to the number of words and syllables required to be comprehended by the audience. The genre and style of the production also alter the duration of titles as does the skill of the editor in maintaining continuity within the movie.

As a consequence, producing insert titles in a traditional fashion requires a number of people each with specialised skills. Writing the text for insert titles requires knowledge of the movie story, genre and an understanding of the culture of the audience. Typesetting the text in a fashion that reflects the genre of the movie requires special design skills, and placing the insert title within the movie sequence at an appropriate place requires the specialised skill of an editor. Thus, creating insert titles is a complicated expensive and time-consuming process.

Current methods of sound editing are highly specialised and the concept of embellishing the final edited rhythm with beat synchronisation is well beyond the scope of most amateur video makers. The time taken to analyse an audio waveform of a chosen sound track and then to synchronise video cuts is prohibitive, the cost of equipment is unjustified for most amateurs, and the techniques are even harder to manage with dual VCR editors.

It is an object of the present invention to substantially overcome, or at least ameliorate, one or more of the deficiencies associated with amateur video production.

SUMMARY OF THE INVENTION

In accordance with one aspect of the present disclosure there is provided a method of editing a video sequence comprising at least one clip, each said clip each having a determinable duration, said method comprising the steps of:

extracting from said sequence characteristic data associated with each said clip, said characteristic data including at least time data related to the corresponding said duration;

processing said characteristic data according to at least one template of editing rules to form editing instruction data, said editing rules comprising at least a predetermined cutting format configured to form edited segments based on a plurality of predetermined segment durations; and processing said video sequence according to said editing instruction data to form an edited sequence of said edited segments.

In accordance with another aspect of the present disclosure there is provided a method of editing a video sequence comprising a plurality of individual clips and associated data including at least time data related to a real time at which said clip was recorded, said method comprising the steps of:

(a) examining said time data for each said clip to identify those of said clips that are associable by a predetermined time function, said associable clips being arranged into corresponding groups of clips;

(b) identifying at least one of a beginning and a conclusion of each said group as a title location;

(c) at least one said title location, examining at least one of corresponding said time data and further data to generate an insert title including at least a text component; and (d) incorporating said insert title into said sequence at said title location.

In accordance with another aspect of the present disclosure there is provided a method of extracting a first number of individual images from a video sequence comprising a second number of individual clips, said method comprising the steps of:

(a) dividing said sequence into segments corresponding to said first number, there being a substantially equal number of said segments divided from each said clip; and (b) for each said segment
(ba) identifying a plurality of video frames within a predetermined portion of said segment;
(bb) processing said frames to select a single representative frame for said segment; and (c) associating said representative frames to form said extracted images.

Other aspects of the present disclosure are specified later herein.

DETAILED DESCRIPTION

The present disclosure includes a number of aspects all intended to assist in the automated editing of raw video footage to permit satisfying reproduction. In one aspect, an automated editing tool provides for rhythmic editing of the raw footage in such a fashion so as to provide an edited version which captures the essence of the original raw footage whilst avoiding the inclusion of excessively long video cuts that might be perceived as non-entertaining to the viewer, or that surpass the attention span of the viewer. In another aspect, an arrangement is provided for extracting from video cuts a selection of individual frames representative of the raw footage so that a still-shot summary of the raw footage may be formed. In a further aspect, a method of providing insert titles into the edited versions to distinguish between different stages of the raw footage is disclosed.

Figure 1A:
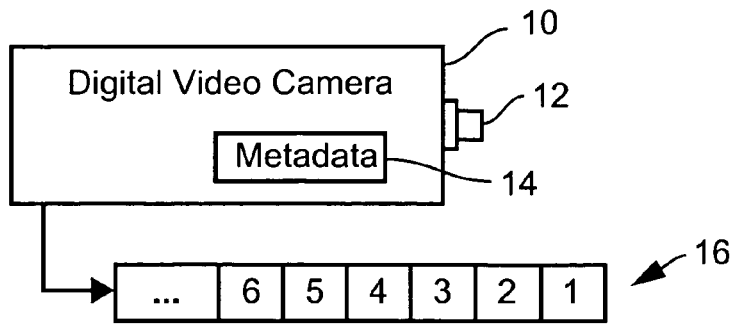
FIGS. 1A and 1B depict the sourcing of digital video clips from each of digital and analog sources.
Figure 1B:
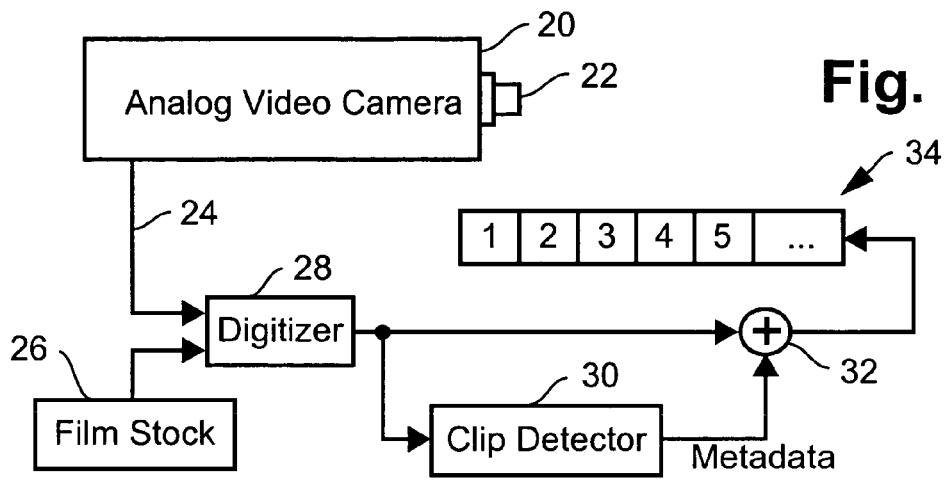

Referring to FIGS. 1A and 1B, video footage is typically obtained from either one of a digital video camera 10 or an analog video camera 20. With the digital video camera, depression of a record button 12 results in the digital recording of a video signal upon a recording medium, typically magnetic tape, magnetic disk and/or semiconductor memory. One specific advantage of digital video cameras is that they incorporate an arrangement by which metadata 14 may be generated by the camera 10 automatically and/or manually generated by the user of the camera 10 for inclusion with, and along side, the recorded digital video. From the digital video camera 10, digital video footage 16 may be output and typically comprises a number of individual clips, represented in FIG. 1A by the numbers 1, 2, 3, 4, . . . . Typically, the metadata recorded with the video includes reference points for the commencement and cessation of any individual clip, and often associated with the specific real-time at which recording was made. These times, and the date, may be automatically recorded. Other details, for example entered by the user or generated by other metadata tools may include data as to the location (for example provides by a such GPS locator device) and/or event information being recorded at the time and other details as desired. Automatically generated metadata may be inserted into or associated with the clip sequence 16, typically coincident with the depression and/or release of the record button 12. The metadata in this fashion becomes a repository of information that is characteristic of the clip and/or its content.

Turning to FIG. 1B, an analog video camera 20 includes a record button 22 to enable recording of video footage, typically onto a magnetic tape recording medium or the like. A signal 24 may be output from the camera 20 for reproduction and/or editing of the recorded footage. The signal 24 is traditionally provided without any indicators as to the commencement or cessation of any individual clip within the overall footage that has been recorded. This is effectively the same as traditional celluloid film stock which typically has no specific mechanism for recognition of different clips. In this regard, the traditional "clipboard" snapped at the commencement of a traditional film shoot is one indicator that is traditionally manually identified by the film editor and is specifically provided for the synchronising of film and audio rather than merely the identification of any one clip.

In order for either analog video derived from the camera 20 or film stock 26 to be processed in a manner akin to the digital video data 16, it is necessary for each of the signal 24 or film stock 26 as appropriate to be input to a digitizer 28 which converts the respective signals into a digital image signal. The output of the digitizer 28 is provided to clip detector 30 which detects transitions between clips and forms metadata which is combined with the output of the digitizer 28 in a summer 32 to provide a digital video signal 34 effectively comparable to that of the signal 16 derived from the digital video camera 10.

The described arrangements may be implemented as a computer application program hosted in a Windows™ operating system environment developed by Microsoft Corporation. However, those skilled in the art will recognise that the described embodiment may be implemented on computer systems hosted by other operating systems. For example, the preferred embodiment can be performed on computer systems running UNX™, OS/2™, DOS™. The application program has a user interface which includes menu items and controls that respond to mouse and keyboard operations. The application program has the ability to transmit processed data to one or more displays, printers or storage arrangements, either directly connected to a host computer or accessed over a network. The application program also has the ability to transmit and receive data to a connected digital communications network (for example the "Internet").

The described arrangements can be practiced using a conventional general-purpose (host) computer system, such as the computer system 40 shown in FIG. 10, wherein the application program discussed above and to be described with reference to the other drawings is implemented as software executed on the computer system 40. The computer system 40 comprises a computer module 41, input devices such as a keyboard 42 and mouse 43, and output devices including a printer 57 and an audio-video output device 56. A Modulator-Demodulator (Modem) transceiver device 52 is used by the computer module 41 for communicating to and from a communications network 59, for example connectable via a telephone line or other functional medium. The modem 52 can be used to obtain access to the Internet, and other network systems.

The computer module 41 typically includes at least one processor unit 45, a memory unit 46, for example formed from semiconductor random access memory (RAM) and read only memory (ROM), input/output (I/O) interfaces including an output interface 47, and an I/O interface 48 for the keyboard 42 a mouse 43 and optionally a joystick (not illustrated). The output interface 47 couples to an audio-visual output device 56 typically incorporating a video display and a loudspeaker arrangement. A storage device 49 is provided and typically includes a hard disk drive 53 and a floppy disk drive 54. A CD-ROM drive 55 is typically provided as a non-volatile source of data. The components 45 to 49 and 53 to 55 of the computer module 41, typically communicate via an interconnected bus 50 and in a manner which results in a conventional mode of operation of the computer system 40 known to those in the relevant art. Examples of computers on which the embodiments can be practiced include IBM-PC's and compatibles, Sun Sparcstations or alike computer systems evolved therefrom. Typically, the application program of the preferred embodiment is resident on a hard disk drive 53 and read and controlled using the processor 45. Intermediate storage of the program and any data fetched may be accomplished using the semiconductor memory 46, possibly in concert with the hard disk drive 53. In some instances, the application program may be supplied to the user encoded on a CD-ROM or floppy disk, or alternatively could be read by the user from the network via the modem device 52.

In particular, the digital audio stream 16 or raw footage 24 may be provided to the computer 41 in any appropriate manner including via a computer network and the modem 52, by means of portable memory device such as CD ROM 55 or directly for example to a "video" input of the I/O interface 48. In this fashion, the entirety of the raw video footage including each of the clips is available for computerised processing within the computer 41.

Figure 10:
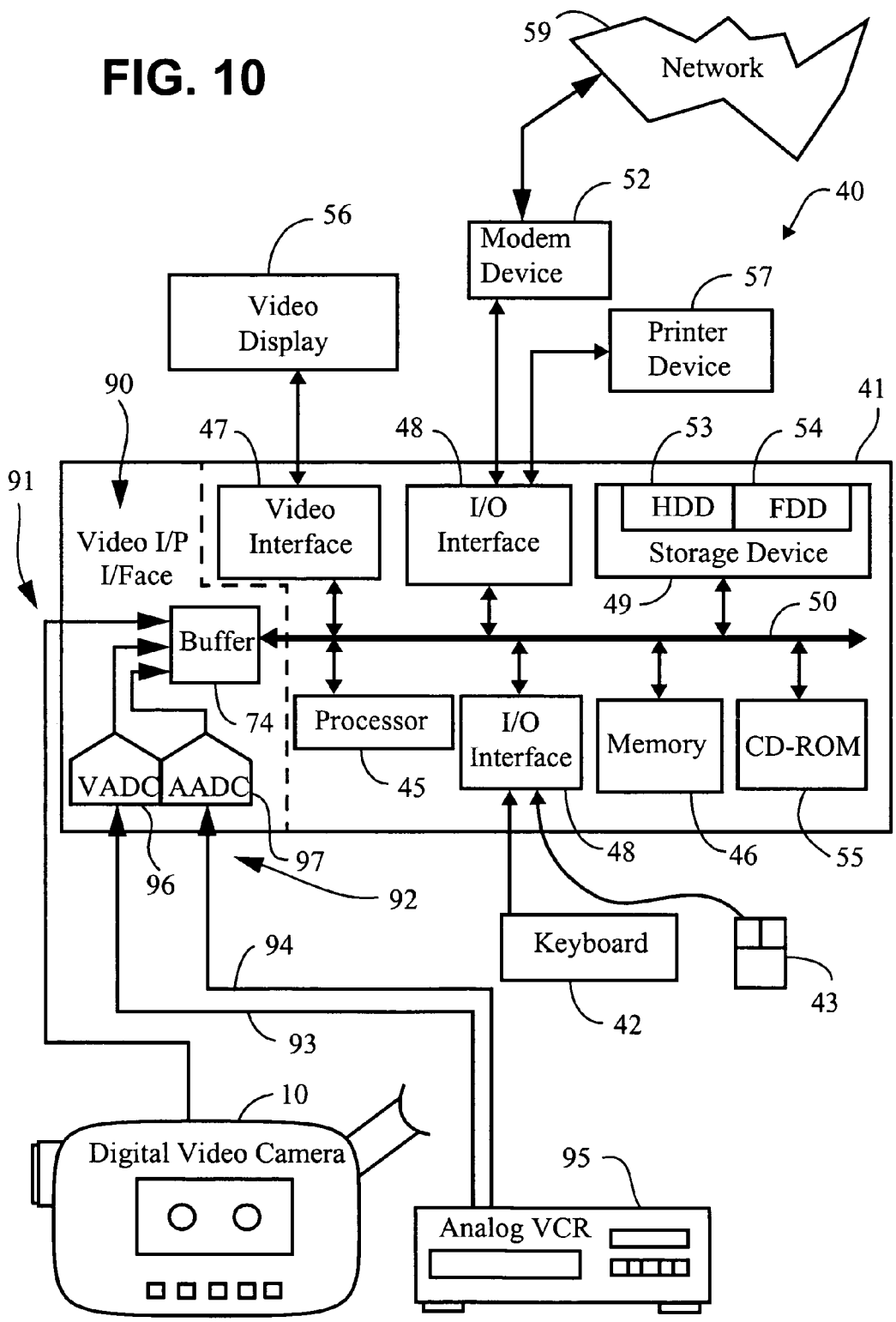
FIG. 10 is a schematic block diagram representation of a general purpose computer upon which the arrangements specifically described herein can be practiced.

As seen in FIG. 10, the modem device 52 allows for connection to a network 59 which may act as a source of digital video information including both video images and an accompanying audio track. Alternatively, a video input interface 90 may be provided which includes an digital input 91 configured to receive digital video information, for example from a digital video camera 10, and an analog input 92 configured to receive video information 93 and audio information 94, each in an analog format from a device such as an analog video cassette recorder 95 or an analog video camera 20. The signals 93 and 94 are input to respective analog-to-digital converters 96 and 97, the outputs of which are, like the digital input 91, applied to the system bus 50 via an isolating buffer 78. Clip detection as shown in FIG. 1B may be performed by software within the computer module 41 so that metadata-enhanced digital video sequences comprising images and audio tracks comparable to the sequences 16 and 34 of FIGS. 1A and 1B may be stored within the system 40 for editing and other manipulation and reproduction via the output interface 47 and the audio-video output device 56.

Rhythmic Sequence Editing

Figure 2:
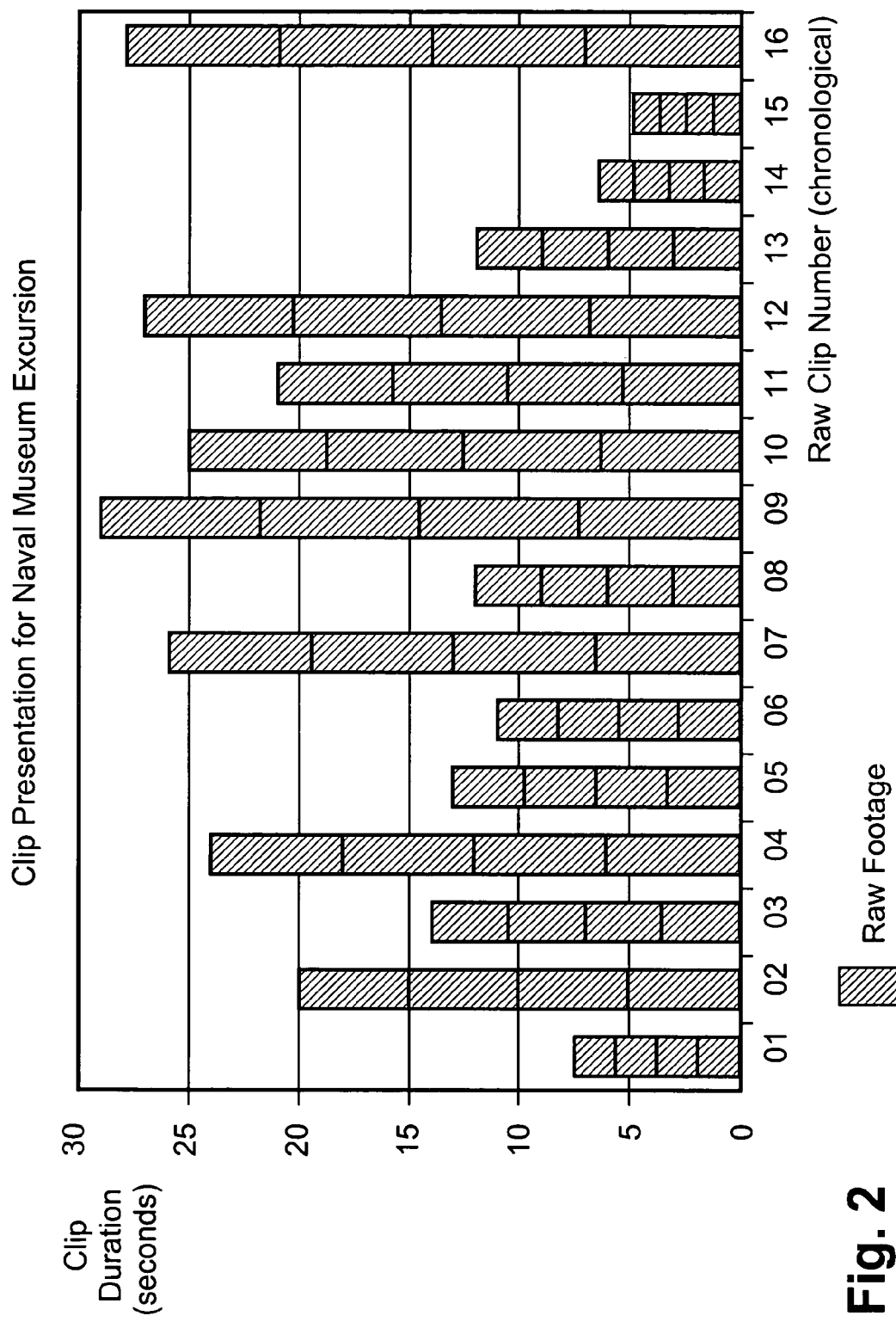
FIG. 2 provides a presentation histogram of a number of clips which together form original raw footage.

FIG. 2 shows a histogram 300 representing a sequence of various video clips (numbered 01-16) obtained from a particular item of footage, in this case an excursion to a naval museum. It is seen from FIG. 2 that a total of 16 individual clips were taken each of varying duration from a minimum of about 4 seconds (clip 15) through to 29 seconds (clip 09). A delineation between each of the individual clips is provided by metadata mentioned above stored in association with each clip.

If viewed in linear (time line) order, portions of the original footage are likely to be construed as being boring, uninteresting and the like. Rhythmic sequence editing relates to the editing of the raw video footage in a way that enhances viewer appeal. Through careful review of professional edited productions, it was determined that the interest of an audience tends to wane after certain, relatively short periods of time, particularly where there is little or nothing in particular upon which the images are focussed. This was appreciated as particularly being the case in domestically produced (amateur) video productions where the content recorded typically has more relevance to the actual film maker, rather than any future audience which is often comprised of family, friends or colleagues. This is to be distinguished from professional productions such as feature films, telemovies and the like where characters and/or action can maintain the interest of an audience even over what might be considered as an excessively long clip that may take numerous minutes to conclude.

A number of rules were then determined which may be applied to any individual clip in an automated fashion so as to achieve a best chance of reproducing the interesting content of any individual clip. The rules determined by the present inventor are effectively two-fold. Firstly, the present inventor has determined that, more often than not, the first portion of a clip, obtained immediately after depression of the record button 12 or 22 as the case may be, is typically of little interest or of poorer quality in amateur circumstances as this is usually the time taken by the user to focus the camera onto the subject of the clip. This typically occupies approximately one second of the clip and for this purpose, a first rule used in editing in a preferred implementation is to ignore the first second of any one clip. It is noted that the period of one second is relative and may be varied according to the duration of the clip in question or of the clips that form the original footage.

The second substantive rule is to divide the remainder of the clip into segments with each segment being one of a predetermined number of intervals each having a specific time period. In this regard, the present inventor has determined that by dividing a clip into segments, each of a predetermined time period, and editing out other portions of the clip which do not match the predetermined time period, allows for an effective compression of the amount of footage to the reproduced, whilst maintaining the essence of the clip and the linearity of the overall footage. In the preferred implementation, the present inventor has determined that clip segments of duration of about 4 and 10 seconds, are best used for the editing of domestic (amateur) video productions. It will be apparent that these time periods may be altered depending upon the specific requirements of the user, the type of source material provided, or, where one is used, the type of editing template selected (to be described below).

Figure 3:
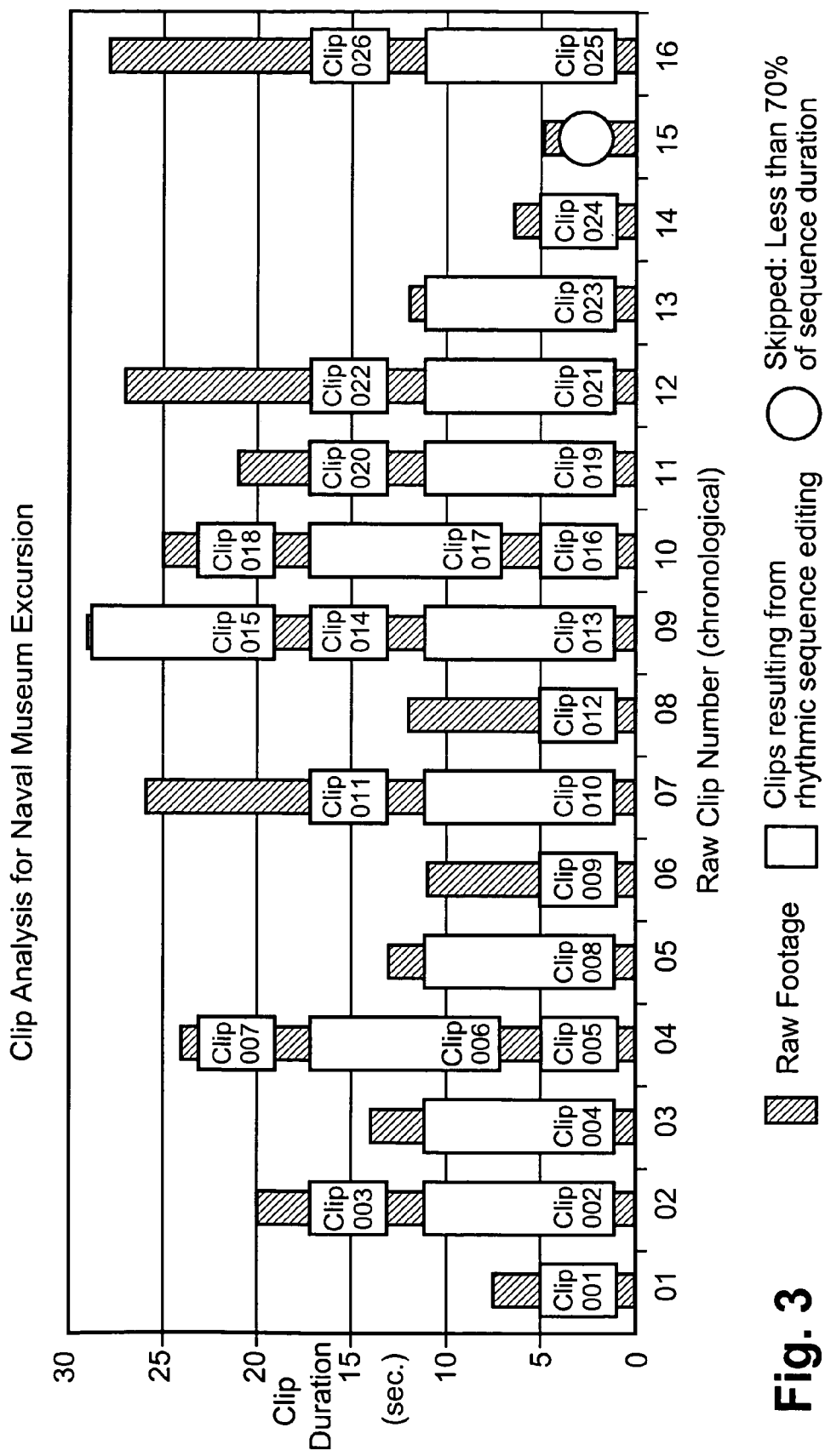
FIG. 3 represents an analysis of the clips of FIG. 2 according to a "10-4" rule defined herein.

FIG. 3 shows a clip analysis according to the above-noted rules for the naval museum excursion depicted in FIG. 2. As can be seen from FIG. 3, the raw footage is indicated again as comprising sixteen raw clips (01-16) with each clip being divided in some way into one or edited clips (001-026) desired for reproduction. From FIG. 3 it will be apparent that each of the edited clips (001-026) commences no sooner than 1 second into each of the raw clips (01-016). Further, the first raw clip (clip 01), which is seen as being approximately 7 seconds long is edited to provide a first clip segment (clip 001) of a 4 second duration. Since the remainder of clip 01 of the raw footage is not sufficient to accommodate another edited segment, the next edited segment is derived from the next raw clip 02. In this particular example, editing takes place using alternate 4 second and 10 second clips and this seen in respect of the second raw clip 02 where a 10 second edited segment 002 is extracted from that clip. Further, since the second raw clip 02 has a duration of 20 seconds, this provides a mechanism whereby a further 4 second clip 003 may be edited from the second raw clip 02. As can be seen from FIG. 3, a predetermined time period, in this embodiment of 2 seconds, is provided to separate edited clips derived from any one raw clip.

In this fashion, each of the raw clips 01-16 of the naval museum excursion are edited using alternate 4 and 10 second segments as required. As will be apparent from FIG. 3, the number of edited segments derived from any individual raw clip is dependent upon the duration of the original raw clip. Further, as is apparent from raw clip 15, since that clip is of a duration less than 5 seconds, the rules described above do not permit editing any resulting clip from that raw footage. This is because removing the first 1 second of clip 15 leaves less than 4 seconds which is less than the desired 10 second segment of the sequence. In this example, the rhythmic sequencing method acts to reject any edited clip which would be less than 70% of the sequence duration of the desired segment intervals. In a preferred embodiment, where a portion of a clip is between 70% and 200% of the desired segment duration, the portion may be modified (by time compression or expansion) so that the reproduction time of the modified portion, which forms an edited clip, matches that of an appropriate 10-4 second segment. For example, a software product marketed under the name QUICKTIME may be used to provide for the compression/expansion of video time frames over the range of about 25-400%.

From the example of FIG. 3, the total duration of the raw footage is 327 seconds spanning 16 raw clips, and as illustrated, this is edited to provide 26 edited clips spanning a total of 176 seconds of reproducible images. As a result, the overall play duration of the edited version is almost halved compared to the original footage. Further, the edited footage provides a rhythmic 4-10 second change between clips to maintain audience interest.

Based on the foregoing, a system for the presentation of a collection of clips can be based on the creation of a profile of the duration of clips and other time related metadata in order to apply a selected rule set, termed herein a "template". A hierarchy of rules may be embedded in the template to accommodate clips of varying duration. For example, clips of only a few seconds or even frames can thus be managed in a manner different to those of hours or many minutes of duration.

Figure 4:
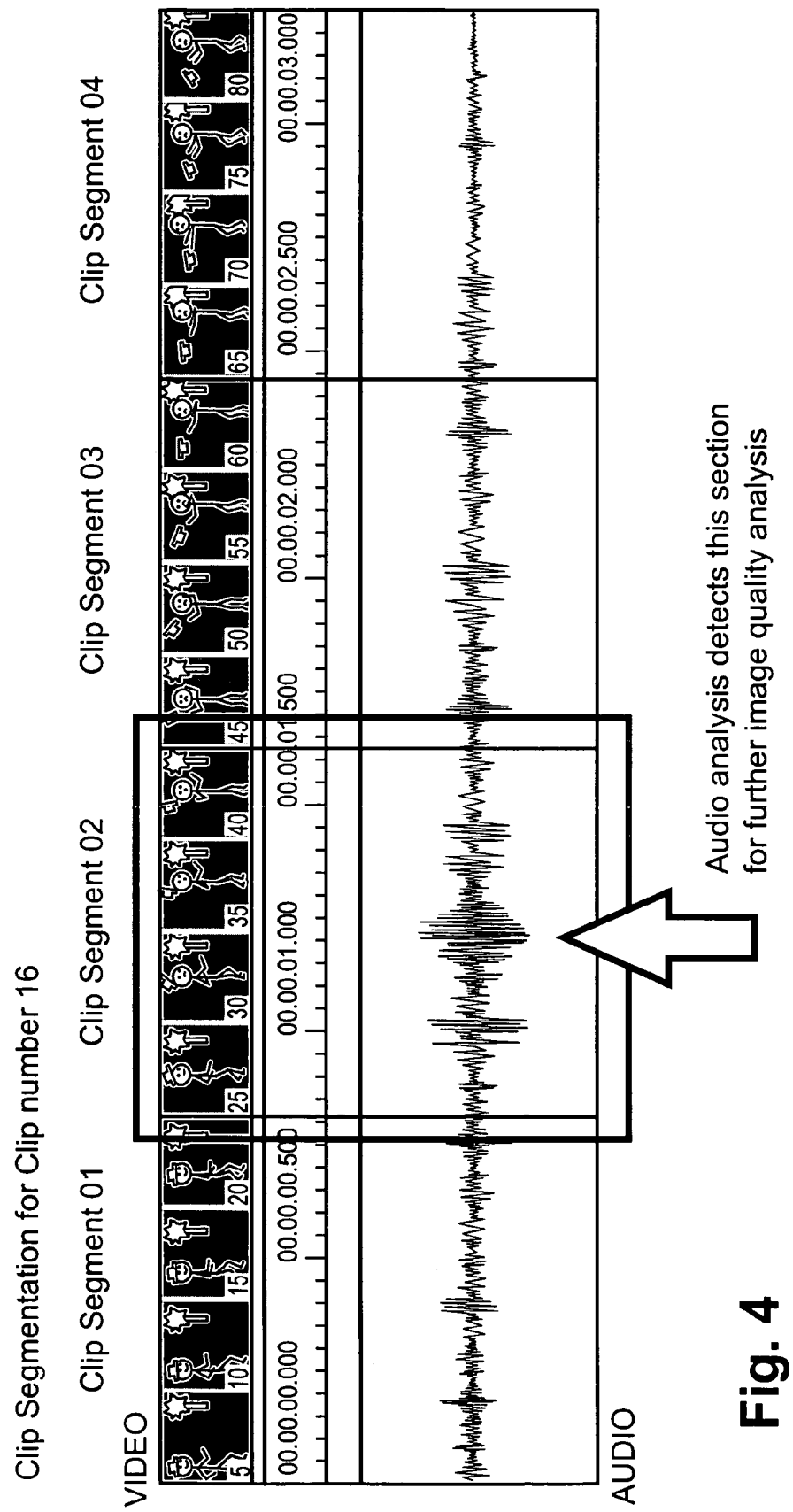
FIG. 4 illustrates a segmentation of a clip based upon audio analysis.

Further, the manner in which individual segments are edited from the original footage may be varied according to the actual content of the footage. For example, whereas FIG. 3 utilises specific timing rules for the selection of edited clips from raw clips, alternative selections can be made. For example, as illustrated in FIG. 4, analysis of an audio track which accompanies the original raw video can be used to identify areas of interest. Examples of such areas of interest include that of the cheer of a crowd at a sporting event or the sound of a speaker at a conference. In this fashion, analysing the audio track to identify passages of increased audio level provides a point at which clip selection may be made either commencing at that point or straddling that point so as to obtain the relevant and probably interesting content before, including and following the audio peak.

Although audio detection for identification of interesting clip segments can be performed merely by examining peak values compared to a predetermined threshold, it is often advantageous for that threshold to be variable and reflective of a background noise level rather than total noise level. With this, the system may generate a profile per presentation of a clip collection or on an individual clip basis, for thresholded peak examination and identification.

Figure 6A:
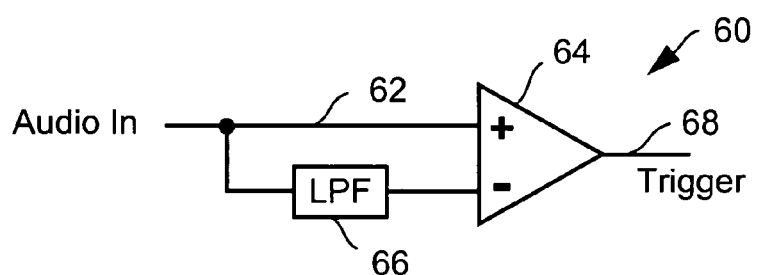
FIGS. 6A and 6B depict various arrangements for implementing audio analysis.

FIG. 6A illustrates an arrangement 60 that allows for the discrimination of audio peaks in the presence of substantial background noise, which may be of a highly variable nature. An audio signal 62 is input to a non-inverting input of a comparator 64 and also to a low pass filter 66. The time constant of the low pass filter 66 is set at a period sufficient to filter out low level background noise not desired for triggering the provision of metadata or the like. The output of the low pass filter 66 is provided to an inverting input of the comparator 64 and provides what is in effect an audio signal averaged over the time constant of the low pass filter 66. The comparator 64 acts to compare the average and instantaneous audio signals to provide a trigger signal 68 indicative of when the instantaneous signal exceeds the average. The trigger signal 68 may be included with the video sequences as (further) metadata.

Figure 6B:
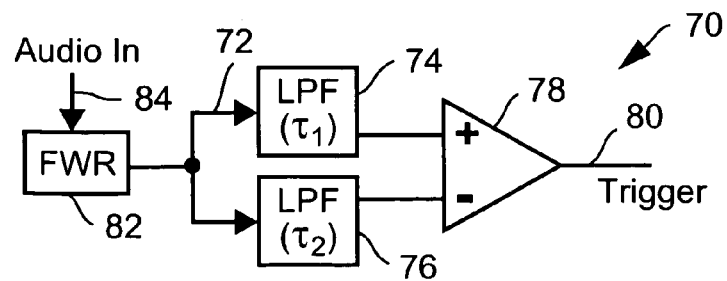

FIG. 6B illustrates a more refined audio detection arrangement 70. An audio input signal 84 is input to a full wave rectifier 82 which provides a full wave rectified signal 72 to a pair of low pass filters 74 and 76, each having corresponding time constants $\tau 1$ and $\tau 2$. The low pass filters 64 and 76 output to respective inputs of a comparator 78 which is also configured to provide a trigger signal 80. With this configuration, the time constants $\tau 1$ and $\tau 2$ may be set to provide appropriate discrimination between background noise and desired audio. For example, $\tau 2$ may be set to a relatively long period (eg. 5 seconds) so as to provide a fair representation of background noise, thus allowing for its discrimination. $\tau 1$ may be set to a lower period sufficient to allow for the detection of desired noise content (eg. cheering of a crowd or a desired speaker's voice) whilst still providing for discrimination from momentary transient sounds. In this regard, $\tau 1$ may be set at a time period of approximately 0.5 seconds. As a consequence, the circuit 70 operates to provide a trigger signal 80 that varies between two logic levels sufficient to provide a marker or metadata as to when a desired audio peak is established. This metadata may be combined with the raw video footage and used in the clip analysis procedures for identifying segments of interest of possible selection in the ultimate edited version.

The arrangements of FIGS. 6A and 6B may be implemented using analog electronics, for example at an input of the audio-ADC 97. Alternatively, implementation using digital arrangements either by hardware (a DSP device configured within the computer module 41) or software (operating within the computer module 41) that implements digital filtering and level comparison.

Further, the editing of raw footage may be substantially, or at least perceptually, synchronised to an audio track intended to be dubbed over the edited footage. This involves examining the audio track to identify an appropriate beat and adjusting the reproduction rate of either one or both of the audio or the video to achieve perceptual synchronism. For example, music having a beat of 120 beats per minute has 2 beats per second which divides equally into any rhythmic sequence having edited clips of duration which is an integer multiple of 0.5 second, such as the 10-4 sequence described above.

With the foregoing described automatic detection methods, and others to be described, it is thus possible to process raw video footage comprised of one or more clips to identify portions of interest which may form clip segments in an edited production that provides a rhythmic sequence of images more likely to attract and maintain the interest of a viewer.

According to a particular implementation, the actual rules applied in the interpretation of any raw video signal are established by a template arrangement which provides for the creation of edited video sequences based upon predetermined video production styles and which may be suited to different types of raw video image. Examples of templates each incorporating predetermined combinations of editing rules which may be used to edit raw video images to provide an edited sequence include:

standard 10-4 format,
music video,
music trailer,
quick look summary,
romance, and
action.

Each different template is configured to provide a stylistically and structurally different result and is selected by the user to provide an interpretation of the raw video footage whether or not that raw video footage may be suited to the particular template selected.

EXAMPLE 1

Standard Template

The standard template is one that may be applied to provide a basic editing of a wide variety of source footage. The various attributes of the template are as follows:

(i) Sequence:

Sequence is a time basis upon which the footage is cut to give a final edited result. Specifically a line sequence may specify the actual duration of edited clips, which in the above example accords to a 10-4 second format. Other formats such as 12-4 or 12-6 may alternatively used.

(ii) Duration:

Duration is generally determined by the number and duration of clips in the raw footage. The overall edited sequence duration may be forced to map to the duration of an accompanying audio track intended to be dubbed into the edited video. Such may not however be appropriate for audio tracks longer than seven minutes.

(iii) Transitions:

Transitions between edited clips are preferably achieved using a four frame cross fade between each clip.

(iv) Cutting Rule:

In a preferred implementation, a number of cutting rules are applied as follows:

(a) Clips are cut in chronological order.
(b) Remove one second from the beginning and end of each original clip before determining a new clip cut length.
(c) Add a 12 frame cross fade between two edited clips taken from same original raw clip.
(d) Where possible apply the 10-4 rhythmic cutting sequence.
(e) When the duration of the clip allows more than one clip to be cut, always ensure the remaining duration allows for 1 second to be omitted from the end, and 4 seconds to omit from between the two clips.

Cutting Rule Example—Standard Template

If the first raw clip is less than 7 seconds, cut to 4 seconds. If the raw clip is 7 seconds, but less than 10, time stretch the original raw clip to 12 seconds and then cut the stretched clip down to provide a 10 second (somewhat slower motion) clip. If the next original raw clip is 14 seconds or more, and less than 20 seconds, omit the first second and cut the next 4 seconds, omit the next 4 seconds, cut the next 4 seconds, omit the remainder until the end of the end of the raw clip. If the next raw clip is 20 seconds or more, omit the first second, cut 4 seconds, skip the next 4 seconds, cut the remaining 10, omitting the remainder up to 27 seconds. If the next clip is 28 seconds or more, omit the first second, cut 4 seconds, skip the next 4 seconds, then cut 10 seconds, omit the next 4 seconds, cut 4 seconds, and omitting the remainder up to 38 seconds.

(v) Effects:

This relates to any visual effects that may be applied to the video footage. In the standard template no effects are applied.

(vi) Time Stretching:

Time stretch the last clip of the edited video up to 200% to make a new duration of 12 seconds. Omit the first and last seconds of the clip by cutting it down to 10 seconds. Fade out to black or template default for the last 3 seconds.

(vii) Audio:

The audio is beat stretched to suit the sequence (either increased or decreased to achieve the best possible match).

(viii) Mattes:

(a) An editable title matte is placed in sequence duration during the first 10 seconds from which a fade occurs to the first clip. An editable "The End" matte is provided in sequence at the conclusion of the edited clip.

(b) Editable scene and cast masts may be provided and need not be placed in sequence.

EXAMPLE 2

Romance Montage (i) Sequence: 12-4 seconds

In this regard, since romance type footage is typically more sedate, and thus the sequence duration is extended slightly compared to the 10-4 sequence to give a more relaxed, slower pace.

(ii) Duration:

Duration is generally determined by the number and duration of clips in a directory. The duration sequence can be forced to map to an audio track duration although this is not recommended for tracks longer than seven minutes.

(iii) Transitions:

For 12 second clips, fade-in to the next clip from 0 to 100% opaque with the last 2 seconds before the current clip ends. Use a four frame cross fade between each clip.

(iv) Time Stretching:

(a) Slow the speed of clips by stretching the duration to 150% thus giving a more relaxed, romantic feel.

(b) Stretch the speed of the last clip up to 200% to make a new duration of 12 seconds (creating the effect of slow motion), omit the first and last second of the clip by cutting it down to 10 seconds, and applying a fade out to black template over the last 3 seconds of those 10 seconds.

(v) Cutting Rule:

(a) Cut in chronological order.

(b) Remove 1 second from the beginning for determining a new clip cut length.

(c) Add a 2 second cross fade between the two clips taken from the same shot.

(d) When the duration of a clip allows more than one clip to be cut, always ensure the remaining duration allows for 1 second to be omitted from the end and 4 seconds to be omitted from between the two clips.

Cutting Rule Example—Romance Montage

If the first raw clip is less than 8 seconds, cut to 4 seconds. If the clip is 8 seconds but less than 12 seconds, time stretch to 14 and cut down to 12 seconds. If the next raw clip is 14 seconds or more and less than 20 seconds, omit the first second, cut the next to 4 seconds, omit the next 4 seconds, cut the next clip to 4 seconds, omit the remaining until 20 seconds. If the next raw clip is 20 seconds or more, omit the first second, cut 4 seconds, skip the next 4 seconds, then cut the remaining 12 seconds omitting the remainder up to 27 seconds. If the next raw clip is 28 seconds or more, omit the first second, cut 4 seconds, skip the next 4 seconds then cut 12 seconds, omit the next 4 seconds, cut 4 seconds omitting the remaining up to the 38 seconds.

(vi) Effects:

Utilise an animated fog filter to provide a misty "romantic" appearance.

(vii) Audio:

Beat stretch/compress the audio to suit the video sequence so as to increase or decrease to achieve the best possible match.

(viii) Mattes:

(a) Editable title matte placed in sequence duration 10 seconds with a fade to the first clip.

(b) Editable "The End" matte provided in sequence.

(c) Editable scene cast and mast provided but not placed into any particular sequence.

EXAMPLE 3

Music Video Clip (i) Sequence:

The sequence in this example is dependent on the audio beat, since generally the video is intended to complement the audio, not vice versa (as it sometimes may appear). For example, for music with less than 100 beats per minute, the 10-4 sequence is used as a basis. For beats equal to or exceeding 100 beats per minute, an 8-3 basis sequence can be used. In each case the actual clip intervals are adjusted to permit substantial beat synchronisation. For example, with music at 96 beats/minute gives 1.6 beats/second, the footage may be cut in a sequence of 10 seconds and 3.76 seconds thereby approximating 16 and 6 beats respectively and providing perceptual synchronism.

(ii) Transitions:

General four frame cross fade between each clip.

(iii) Duration:

Duration of the cut sequence is forced to map to audio track duration. This is not recommended for tracks longer than six minutes.

(iv) Cutting Rule:

(a) Cut in chronological order.

(b) Remove 1 second from the beginning and end of each original clip before determining new clip cut length.

(c) Add a 12 frame cross fade between clips taken from the same shot.

(d) Apply the (eg. 10-4) rhythmic cut sequence.

(e) When the duration of a clip allows for more than one clip to be cut, always ensure the remaining duration allows for one second to be omitted from the end and 4 seconds to omit from between the two clips.

Cutting Rule Example—Music Video (for the 10-4 Sequence)

If the first raw clip is less than 7 seconds, cut to 4 seconds, if the clip is 7 seconds but less than 10 seconds, time stretch to 12 seconds and cut down to 10 seconds. If the next raw clip is 14 seconds or more and less than 20 seconds, omit the first second, cut the next 4 seconds, omit the next four, cut the next 4 seconds, omit the remaining until 20 seconds. If the next raw clip is 20 seconds or more, omit the first second, cut 4 seconds, skip the next 4 seconds and then cut the remaining 10 seconds omitting any remained up to 27 seconds. If the next raw clip is 28 seconds of more, omit the first second, cut 4 seconds, skip the next 4 seconds, then cut 10 seconds, omit the next 4 seconds, cut 4 seconds, omitting the remainder up to 38 seconds.

(v) Effects: None.

(vi) Time Stretching:

For a 10-4 sequence, time stretch the last clip up to 200% to make a new duration of 12 seconds, omit the first and last second of the clip cutting it down to 10 seconds. Fade out to black or template default for the last 3 seconds.

(vii) Audio:

Although not preferred in order to ensure audio integrity, the beat may be stretched or compressed to suit the sequence and obtain a best possible match.

(viii) Matte:

(a) Editable title matte placed in sequence duration 10 seconds for the first clip, fade into the first clip.

(b) Editable "The End" matte provided in sequence. Editable scene and cast matte provided but not placed in sequence.

EXAMPLE 4

Quick Look Template

The Quick Look template provides the user with a short running preview of all of the footage that may be presented within raw video content. The Quick Look template provides the preview within a designated default time period, for example 30 seconds, or to a time period specified by the user. The rhythmic editing sequence is applied to accommodate the original raw footage of a duration many times longer than the predetermined time period (30 seconds) by cutting clips to short durations of only frames in length. Clip speed may be altered in the range 100-600% for example and cut durations may range from a few frames to a few seconds. A variety of Quick Look templates may be formed as desired.

Quick Look Example 1

Clips may be cut into segments of ten frames and four frames in a fashion corresponding to the 10-4 rule mentioned above. In order to present more footage into these short durations, the footage is stretched sometimes up to 300% of the original play speed, and in some cases, the frame rate of the original footage is reduced. For example, using the arrangement shown in FIG. 3 where it was indicated that 176 seconds of standard edited clips were derived using the 10-4 second rule, those same clips may be processed to extract ten and four frame segments from each clip giving 176 frames for reproduction. At a frame rate of, say, 25 frames per second as used in the PAL reproduction system, this equates to approximately 7 seconds of replay time. According to the Quick Look implementation, selected ones of the four and ten frame segments, or alternatively their entirety, are stretched to achieve the 30 second preview time. The user can select longer "preview" of the raw footage and can adjust system parameters such as frame rate and time stretching.

Quick Look Example 2

In this example, a rhythmic cutting rule such as the 10-4 rule is not applied. The user specifies the duration of the Quick Look, which generally will be related to the overall length of the source footage. For instance, 5 minutes of raw footage may be desired to be compressed into 30 seconds of Quick Look reproduction. The user can adjust the cut lengths to be an even fraction of the overall duration. For a 30 second output, this may be formed of 30 one second segments spliced together. Each segment may be obtained by dividing each clip into 3 second portions, each separated by a 1 second (waste or cut) portion. Each 3 second portion may be compressed in time by 300% to give the desired reproduction duration. Thirty of these portions are then used to form the Quick Look preview. Where the raw clips are of varying duration, it may be desirable in the template to ensure a portion is extracted from each raw clip.

Quick Look—Comparative Example

This Example compares a number of Quick Look sequence rules against an Action sequence, as seen in Table 1 below:

TABLE 1

| Rule | Action | Quick Look |
|---|---|---|
| set 'IN' point from start of clip | 1 sec. | 2 sec. |
| set 'OUT' point from end of clip | 1 sec. | 2 sec. |
| period to pass before setting next 'IN' point in same clip when duration allows | 2 sec. | 1 sec. |
| clip speed | 100% | 200% |
| skip clip if duration x% is smaller than cut duration | 70% | 70% |
| number of cuts that make a rhythm cycle | 2 | no cycle |
| duration of cut in rhythm cycle | 10 sec. | — |
| duration of cut in rhythm cycle | 4 sec. | — |

The above Examples only describe a few different template arrangements which may achieve a certain style of edited video reproduction. It will be appreciated by those skilled in the art that the above rules regarding automated editing can be modified to establish alternative template configurations. An example of this is where different ranges of compression/stretch may be used based on the particular genre being manipulated. Examples of other types of templates can include those that reflect various established movie styles, such as "martial arts", "sci-fi", "horror", "war" and "western". Other styles such as "sports" and "action" may be used. Where desired, multiple templates may be applied to raw footage. For example, raw footage may be edited according to the romance template, and the edited version then further edited according to an action template. Further, where multiple templates are used in sequence or combined, a hierarchy of the various rules may be applied, not to override any particular effect, but to permit priority ordering of the rules and their application.

In each instance, the particular style is founded upon the use of a number of standard edited clip lengths (eg. 10-4, 12-4) which have been found to be generally applicable to the style of edited reproduction that is desired. Although the above templates supply only two base clip lengths, a further number of clip lengths may be used depending upon the particular circumstances. For example, wild life or scenic footage may be well suited to the editing of longer clips, at least intermittently with clips of shorter duration. Further, although the 10-4 and 12-4 format is preferred in the various templates described above, other durations may be used. Typically, the "shorter" duration will typically be of a period of between 1 and 8 seconds with the longer duration being between 12 and 20 seconds. Also, the 1 second cutting from the commencement of each clip can be varied. Typically, any period between 0.5 and 2 seconds may be used. Further, the 2 second interval between the selection of edited segments may be varied. Durations of 1 to 5 seconds may be appropriate. Further, whereas the embodiment of FIG. 3 depicts alternate 4 and 10 second edited clip lengths, the selection between the various clip lengths may be modified to an alternative pattern for example, short, short-short-long or alternatively, a particular duration for use may be selected on a pseudo-random basis. Such may be found to be useful where there are more than two base durations.

The system cuts the raw footage according to the chosen template structure using its rhythmic sequence in appropriate transitions, beat synchronised music and to add digital effects. Examples of such effects include altering the original colour palette, fog filtering the image, and distorting the image. In this fashion, the rhythmic sequence editing system described herein applies the skills of a film editor, sound editor and special effects editor to the source video taken by an amateur thereby allowing the amateur to be free to direct the rearrangement of the video to modify, adjust or simply appreciate the results. The process of applying these effects to the raw video is fast and is well suited to off-line (ie. non real-time) processing within the computer system 40. Such a process also frees the amateur film maker to make higher level decisions regarding the content of the edited video rather than consuming time through the repetitive task of placing transitions and in-output points in their clips. The arrangement also permits real-time operation. For example, for a given raw video source, a desired template may be selected by a simple keystroke or clicking of the mouse 43 which results in the automatic editing of the video source by the system 40 and a rendering of the edited sequence to the output device 56 for immediate viewing by the user. Further, multiple windows may be operated permitting simultaneous real-time editing and reproduction of source video according to multiple templates. This, for example, can permit a real-time comparison between a 10-4 template and a 12-4 template thus permitting the user to an output that is more appealing.

In operation, the rhythmic sequencing editing system described achieves edited results by examining the metadata associated with the raw video footage to produce an edit decision list (EDL) which represents a combination of the information from the above-noted templates. Since fundamental rhythmic sequence processing can be performed solely upon the metadata, which includes clip number, duration, frame number and the like, and without any knowledge or need to access the actual video content, evaluation of the edit decision list can be achieved quickly and without requiring the video maker to devote (typically hours of) time setting appropriate in and out points. Once the edit decision list is created, the list is applied to the raw footage to select the appropriate bit sequences for reproduction. This may be performed in real-time or alternatively by copying the edited output to a contiguous reproduction file.

Figure 9:
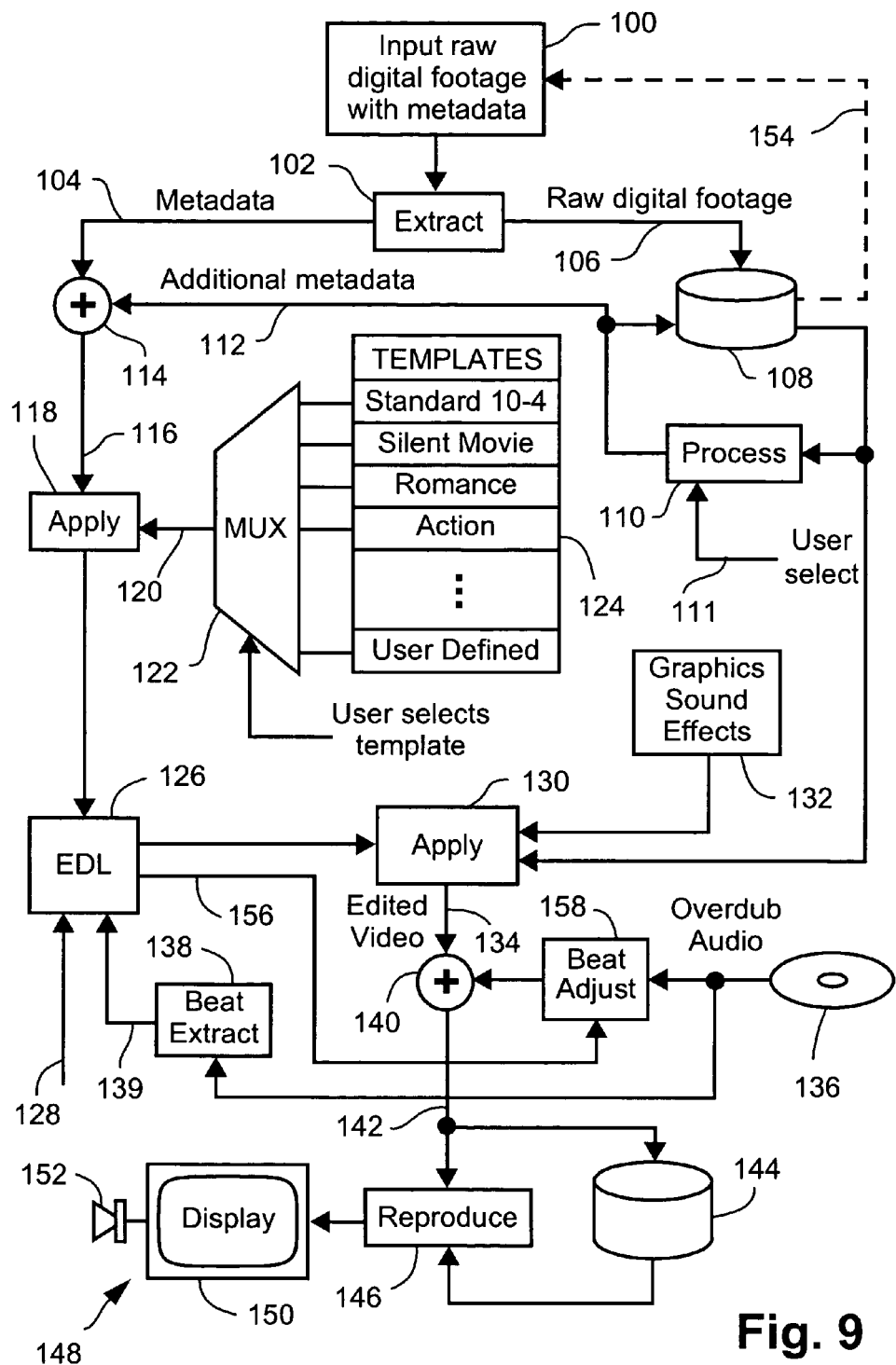
FIG. 9 is a data flow diagram of a preferred editing method.

FIG. 9 depicts a data flow arrangement for a method of editing raw video footage in accordance with a specific implementation. Raw digital footage comprising video images and any accompanying audio track is input at step 100 together with metadata associated with that footage and identifying at least the various clips within the footage. The input footage is provided to an extraction process 102 that extracts the metadata 104 from the raw digital footage 106. The raw digital footage 106, including images and any accompanying audio, is stored in an appropriate manner, typically on a magnetic hard disk storage arrangement 108. Where the particular configuration permits, the input raw footage may be derived from the store 108, as indicated by the line 154.

Where it is desired for further metadata to be derived from the raw digital footage, that footage is extracted from the storage 108 and provided to a metadata determination process 110 which acts to process the raw digital footage 106 so as to extract additional metadata 112 for combination with the original metadata 104 in a summing arrangement 114. The metadata extraction process 110 may include an audio extraction arrangement such as those indicated in FIG. 4, FIG. 6A or FIG. 6B. Alternatively, or additionally, other data extraction processes may be used. These may include comparison of individual frames of the raw footage to identify motion of parts of the image and any collision therebetween, such for example being useful for the provision of captioned graphics and/or sound effects. Other metadata extraction processes include face detection, line detection and motion detection, to name but a few. As seen in FIG. 9, the process 110 includes an input 111 that permits the user to select a particular metadata extraction process to be performed. Where metadata 112 is extracted using the process 110, such may be saved in the store 108 with the raw video alongside existing metadata. By default, no additional metadata extraction processes are performed. The summer 114 outputs combined metadata 116 to an application module 118.

In order for beat synchronisation to be performed, an overdub audio source 136 is analysed by a beat extraction process 138 that identifies the beat of the source 136 which may be used in rhythmic sequence editing. The extracted beat 139 is input to the application module 118.

Also input to the application module 118 is a specific editing template 120 selected by the user via a multiplexer 122 from a repository of templates 124. As seen in FIG. 9, in addition to predetermined templates that may be provided direct to the user, provision is also included for the user to define their own template structure which may be an original creation or alternatively a modification of one or more existing templates. The application module 118 applies the selected template to the metadata 116 and extracted beat 139 to form the edit display list (EDL) 126 which represents the clip actual segments and their corresponding periods to be selected from the raw digital footage for reproduction in the final edited version. The edit display list 126 also includes an input 128 permitting the user to edit any title segments associated with the edited version.

The combined metadata 116 may be represented as a list and retained with the edit display list 126 and may be used to mark edited clips of importance in the final edited sequence.

The edit display list 126 is input to a further application module 130 which interprets the edit display list to cut the raw digital footage stored in the storage 108 and extract appropriate edited segments. The application module 130 also extracts graphics, including animation and captions, together with any appropriate sound effects from a storage 132 for combination with the edited video to provide an edited video output 134. Where appropriate, the edit display list 126 can output beat control commands 156 to a beat adjustment unit 158 which is configured to alter the reproduction rate of the overdub audio source 136 so as to match the rhythmic sequence editing formed by the application module 130. It will be appreciated in this regard that in some instances it may be appropriate to substantially match the audio reproduction rate to specific edit intervals (eg. 10-4) or alternatively adjust the edit intervals (eg. from 12-4 to 11.5-3.5) to substantially match the beat of the audio source 136.

The edited video 134 may then be combined in a summing unit 140 with the overdub audio track derived either directly from the source 136 or the beat adjustment unit 160 as required. The summing unit 140 outputs edited audio-visual footage 142 which may be stored either in a storage unit 144 or directly output to a reproduction unit 146 for reproduction in a reproduction system 148 including a video display 150 and an audio loud speaker 152.

Insert Title Generation

Figure 11:
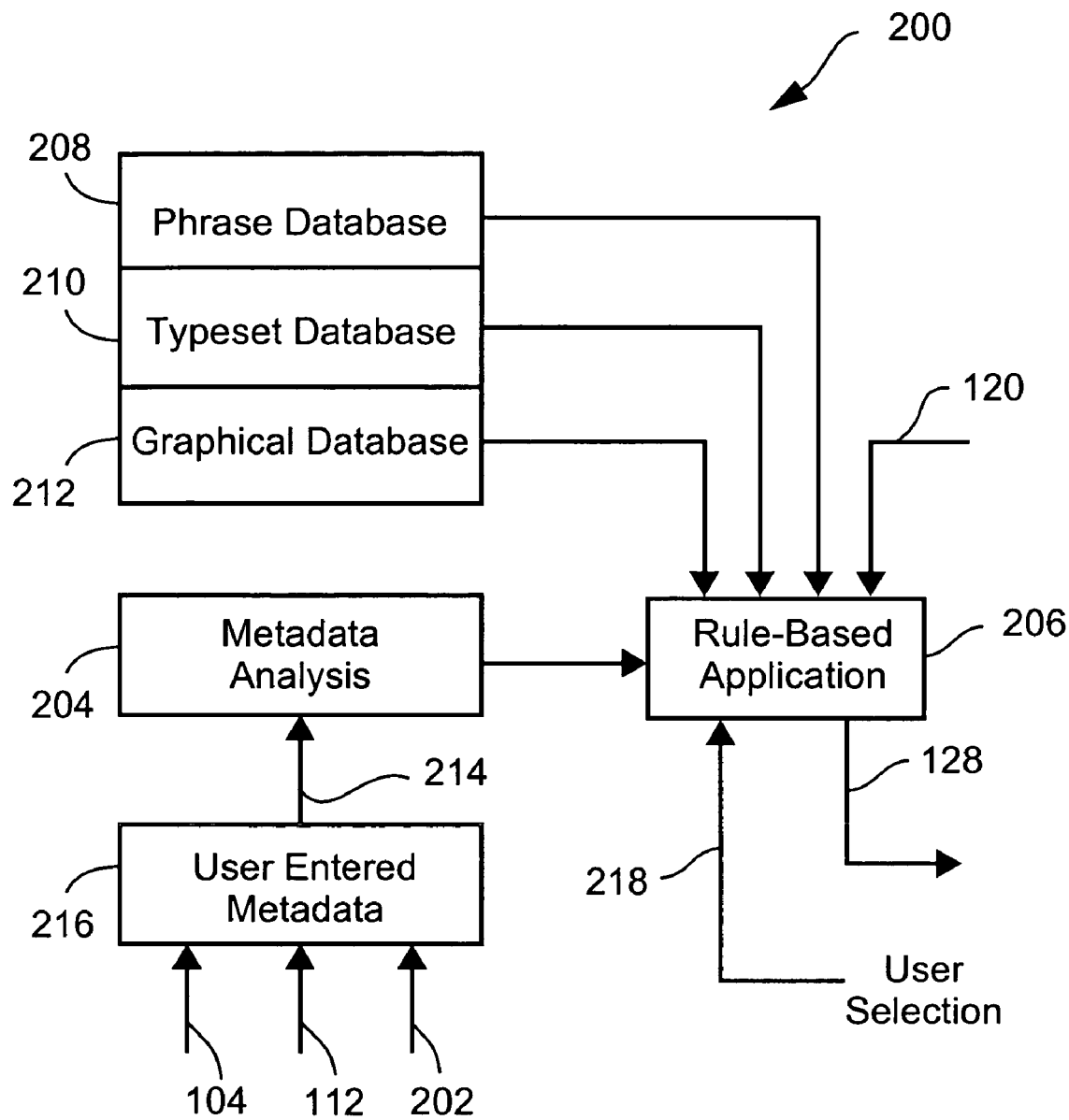
FIG. 11 is a schematic block diagram representation of an insert title generator.

The insertion of titles into an edited video production is desirable and can be achieved in the arrangement shown in FIG. 9 via the input 128 to the edit decision list 126. Such permits the automatic insertion of graphically typeset insert titles contextually within a series of clips comprising the video. This can be achieved in such a manner as to require little time and effort by the user. An insert title generator is provided which adopts the role of the writer, typesetter and editor and uses the phrase database, rule-based application metadata analysis and interface for user entered metadata. An example of such an arrangement is shown in FIG. 11 where an insert title generator (ITG) 200 is depicted. The ITG 200 includes an input module 216 for user entered metadata 214. Such user entered metadata 214 may be derived directly from the metadata 104 sourced from the original raw footage 100. Examples of such metadata may include metadata inserted by the user at the time of actually recording the raw footage together with the actual time of image capture. The user entered metadata 214 may also include additional metadata 112 derived from the user selected generation process 110 to the editing system. Further, an entirely separate user entered metadata input 202 may be provided enabling the user to directly enter the metadata during the editing stage. The user entered metadata 214 is provided to a metadata analysis unit 204 which analyses the characteristics of the metadata 214 to implement a rule-based application 206 which acts to form an insert title output 128 from a combination of a phrase database 208, a typeset database 210, and a graphical database 212.

With reference to the traditional method of creating insert titles, the "writer's" role is facilitated by the user entered metadata 214 which supplies information regarding not only the clip duration and recording time, but also information regarding the story underlying the footage, any key scenes and movie genre. The metadata analysis unit 204 analyses the content of the metadata 214 to obtain information regarding the time code and clip duration. The time code metadata can be used to cluster clips taken at relative times.

For example, raw video may consist of shots taken early in the morning, around 7 am, later at 9 am and some shots taken around 12 midday. The metadata analysis 204 uses this metadata to establish three distinct scenes that delineate where any insert titles may be provided. The user can adjust the threshold of time clustering between clips where it is desired to alter a default preset within the ITG 200.

The ITG 200 supplies the content or prose of the insert title by cross-referencing the analysed metadata with a database of culturally relevant catch phrases, sayings and catchy slang words, extracted from the phrase database 208. The cross-referenced results produce witty insert titles that are contextually based upon the user entered metadata 214. The prose is placed into a professionally designed template extracted from the typeset database 210 and fulfilling the typesetter's role and removing the need for other graphic tools in manipulating the text. As appropriate, the graphical database 212 may be extracted to provide a matte backdrop for the insert title where this may be desired. A time code metadata and a set of rules that define the placement and duration of the insert titles completes the editor's role in sequencing the insert titles and thus creating a higher level of continuity and entertainment within the production. The duration of the insert titles may be determined by a number of factors including any rhythmic sequence editing being applied to the original footage, and the length of text to be displayed, and hence read by the audience. These factors may be incorporated into a template.

For example, a user may have taken a video of a scout's camping excursion and, using the ITG 200, the user enters a series of key words, describing the event as a whole and also for each specific scene identified by the system. The footage, as an event, may be described as: "camping", "scouting", "teamwork", and "survival". A first scene consisting of a shot of the scouts having fun while pitching tents is described by the user as "friends", "fun", "boys" and "help". The system then uses these key words to establish the context of the event and to then present a catch phrase or list of catch phrases to the user from which a selection may be made. Examples of such catch phrases in this example may include:

"Boys will be boys",

"A friend in need is a friend indeed",

"Survival of the fittest",

"Time flies when you're having fun".

The user makes a selection via an input 218, and the ITG 200 accepts then places the selected phrase at the beginning of the described scene. This is done by associating the selected title with metadata identifying the appropriate scene. In this fashion, the user can generate title mattes by supplying keywords on a scene-by-scene basis, or simply by describing the movie as a whole, and allowing the system to cross-reference the time code or other types of metadata. Title mattes can be produced that refer to common events that take place at a particular time of the day. For example, clips taken around noon may invoke suggestion of phrases such as "lunch time". If clips commence at 7 am, a phrase such as "a new day dawns" may alternatively be suggested. Where appropriate, metadata obtained from a global positioning system (GPS) arrangement can be used to suggest an insert title having content indicative of the locality in which events take place. Cross-referencing in this manner may be useful for focussing a search for the correct title to suit the particular scene being processed.

Figure 8:
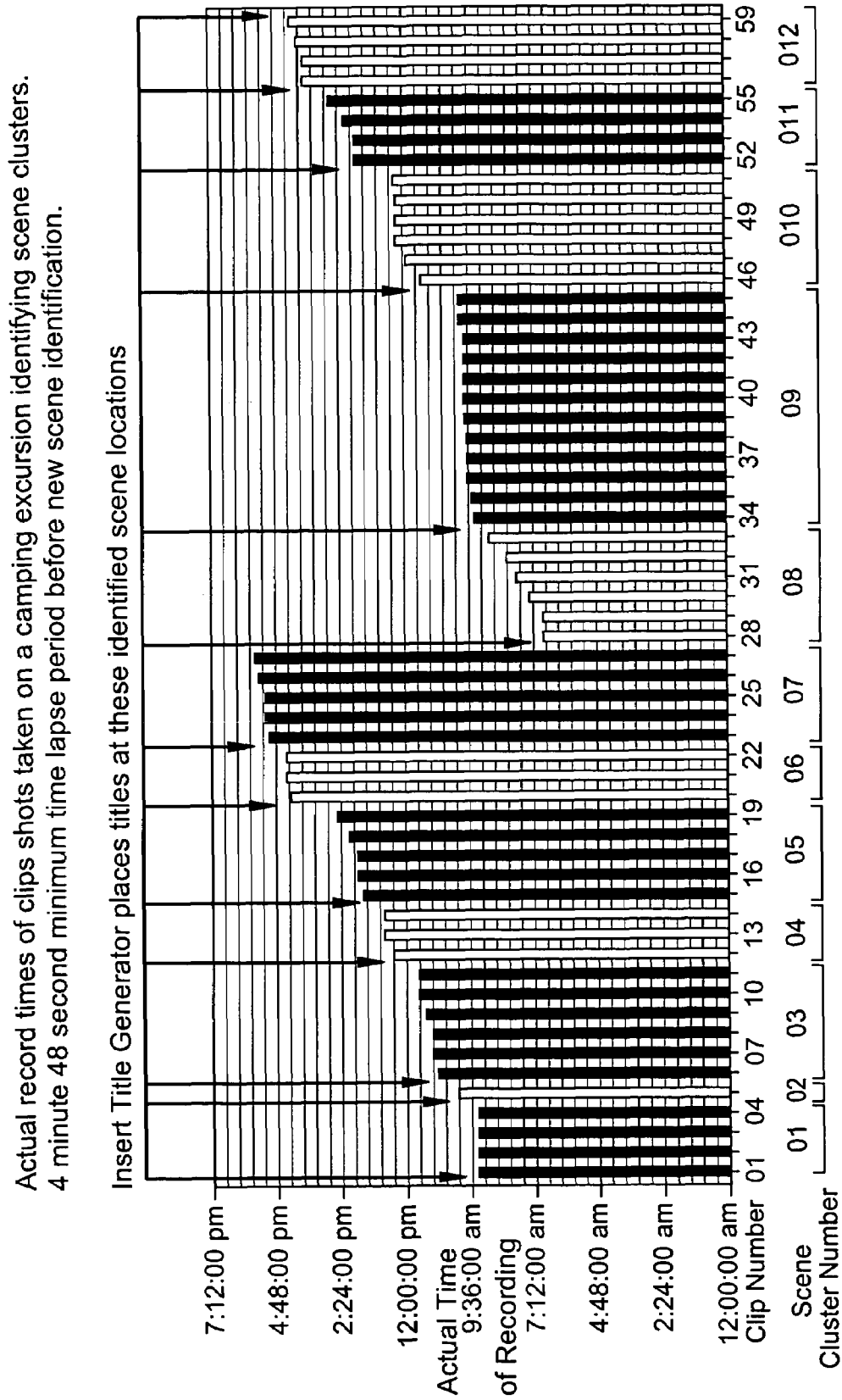
FIG. 8 depicts the insertion of titles based on a further example of a clip arrangement.

The most basic scene identification is performed in an automatic fashion using the record time metadata associated with the raw footage. This is depicted in FIG. 8 which demonstrates a result of the ITG system 200 where titles are placed based on a clip clustering within a range of 4 minutes 48 seconds. Any clip displaced in real-time by more than 4 minutes 48 seconds from the completion of the preceding clip is considered by the system as a new scene.

As seen in FIG. 8, clip numbers 1 to 4 (the duration of each of which is indeterminate from FIG. 8 and is irrelevant for the purposes of the present discussion) are each taken at approximately the same point in time (about 9.30 am) and there is no interval exceeding 4 minutes 48 seconds between each clip. As a consequence, clips 01 to 04 are grouped as a first cluster (cluster 01) of clips of the original footage. As seen, clip 05 is taken at approximately 10am, well separated in time from clips 01 to 04 and the following clips, clip 06 onwards. Accordingly, clip 05 becomes its own cluster, in this case, cluster 02. Clip 06 was taken at approximately 10.40 am and is followed by clips 07 to 11, the separation between the taking of each is no more than 4 minutes 48. As a consequence, clips 06 to 11 form a third cluster of clips. In this fashion, each of the chips of the original footage are divided into clusters with the commencement of each cluster forming a location at which an insert title may be provided to describe the various scenes in the original footage.

The foregoing rule-based analysis of time codes defines clusters of clips taken at similar times as well as those taken on different dates. In this regard, it is seen that clip 27 is taken at approximately 5.30 pm, whereas clip 28 is taken at approximately 6.45 am, clearly on the following day. These results allow for automatic insertion of scene mattes using the insert title generator 200 or an indication via a graphical user interface to the user of individual scenes.

The choice of insert title templates and the number of syllables, words and characters the audience must read acts to determine the duration of which the title mattes run. The ITG 200 uses the system of combining these factors to obtain a compromise of message comprehension, editing rhythm as well as the correct choice of font to ensure maximum legibility. Further, and where appropriate, the genre of the sequence may determine the insert title duration. For example, where the genre is one of tension or fear (eg. a horror film), the duration may be reduced to thus place stress on the audience when reading the insert title.

The duration of title mattes preferably matches the editing rhythm of the template structure described previously. A template structure consisting of the 10-4 rule preferably has title mattes matching the duration of 4 seconds. Likewise, the template structure consisting of a 8-3 rule could have title mattes matching a duration of 3 seconds. The ITG 200 acts to analyse the duration rules of the selected template to determine an appropriate duration for the insert titles.

In some circumstances, it may be that a template has a structure that accommodates the duration of title mattes conveniently. For example, a duration of 3 or 4 seconds may be sufficient to allow an audience to comprehend the message. In this fashion, the ITG 200 can include an input 120 from the multiplexer 122 identifying the selected template. In this fashion, the phrase database 208 may include an embedded rule for title duration thereby enabling the rule-based application 206 to specify an alternative duration in the event of a message exceeding the available duration required for comprehension. Such may occur in the use of stylistic dominant templates. Such templates consist of specific time format productions such as newscasting and music videos.

Productions that run for a short period of time, or have fast cuts with clip duration of less than 25 frames, require the messages on the title mattes to have a layout, word/syllable count, and typesetting, to suit the time available for the audience to comprehend the content. For example, if the duration of a title matte is only 14 frames, the ITG 200 acts to select from the phrase database 208 only short messages of one or a few words and, if the typeset database 210 allows, typesetting the message in a bold legible typeface.

Although the ITG 200 is described with reference to the arranged rhythmic sequence editing system of FIG. 9, its use and operation is not limited to such a specific application. Identification of scene changes and the like together with the specific rules regarding metadata entry, and phrase and typeset selection may be implemented without reliance upon the rhythmic editing of the original footage. As a consequence, insert titles may be added directly to the original footage without requiring any editing of that original footage.

Scene identification as described above with reference to the insert title generator 200 may be used not only to identify place holders for title mattes, but also for other elements such as the correct use of transitions. Specifically with reference to rhythmic sequence editing, the "fading" transition used for the beginning of a scene and the "fade out" for the end of scene will differ stylistically from other cutting techniques throughout the production as each represents a different meaning within the video production story.

The scene identification system when combined with the template structure of titles and rhythmic sequence editing allows for automatic placement of sound track and sound effects. The system processes this information and uses the result to know where title music should be placed and where sound tracks should commence. The beat of the sound track may be extracted and, depending on the particular video template rules, be either modified to match the editing sequence, to modify the editing sequence to match the beat, or to modify both, resulting in a synchronisation of the music and video cutting.

In this fashion, the rhythmic sequence editing system can produce edited, entertaining results for users who wish to view their video without having to spend excessive time reviewing the original raw footage. Since the raw footage contains shots often longer than intended, and sometimes shots that were not intended to be recorded at all, these may be edited in a convenient and substantially transparent manner to the user.

Print Frame Selection

A further editing process that may be applied to the raw video provides for the selection of individual frames desired for printing or for slide-show display which is indicative of the original footage.

Figure 5:
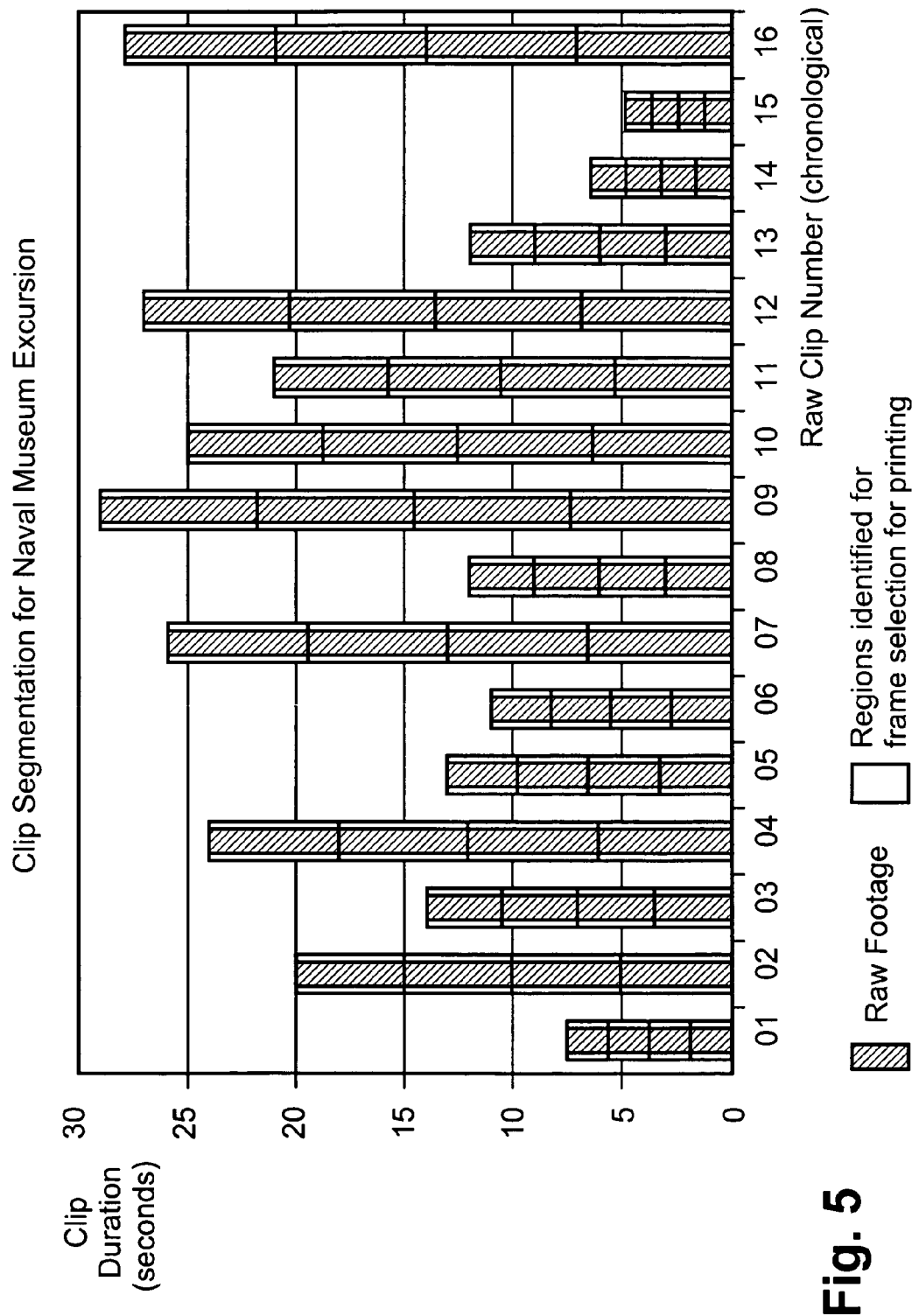
FIG. 5 depicts the segmentation of the raw footage of FIG. 2 for use in frame printing.
Figure 12:
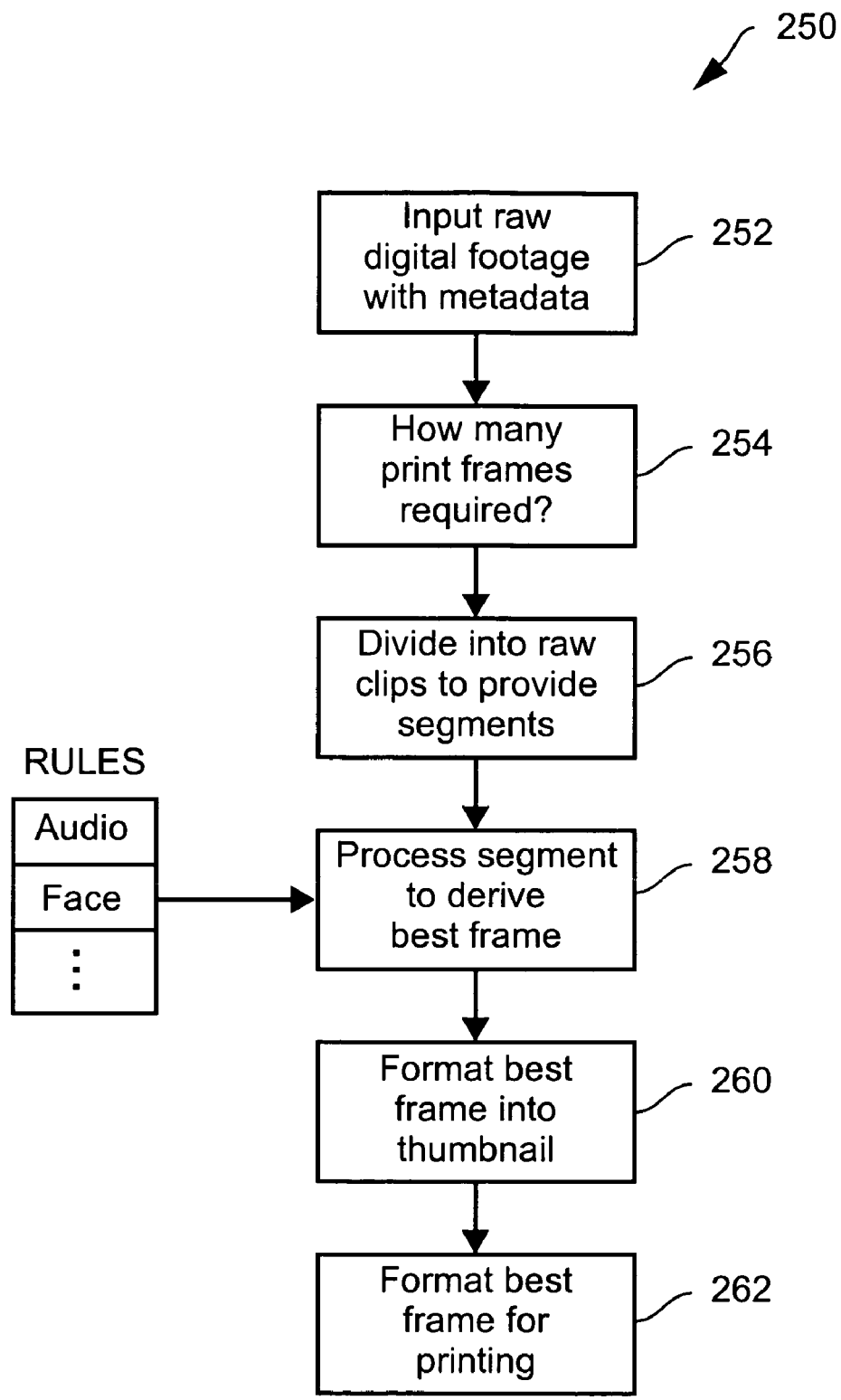
FIG. 12 is a flow chart depicting the print frame selection method.

Referring to FIG. 5, the raw footage of the naval museum excursion is again shown as a series of 16 individual clips, each of varying duration. With reference also to FIG. 12, the clips may be divided in a manner to provide individual thumbnails representative of the overall footage.

As seen in FIG. 12, a method 250 of performing print frame selection is shown which commences at step 252 with the input of raw digital footage incorporating metadata such as that necessary to distinguish individual clips of the footage and to identify their duration. At step 254, the user is requested to identify the number of print frames required for the particular footage. The actual number may be suggested by the system based upon the overall length of the original raw footage and/or the number of individual clips contained in that footage so that the number of print frames selected is representative of the overall content of the footage. Once the number of print frames is selected, the raw footage and in particular the individual clips are divided to provide segments from which individual print frames are to be selected. As seen in FIG. 5, the raw footage is divided to provide 64 print frames with 4 print frames being selected from each individual clip. In this fashion, each clip is divided into 4 segments of equal duration determined by the number of print frames required to be derived from the individual clip. At step 258, each segment is processed to derive a best frame for printing. At step 260, the best frame for each segment is formatted into a thumbnail image and in step 262, the selected formatted best frames are formatted in a fashion suitable for printing.

Step 258, where individual segments are processed to derive the best frame, acts to apply a number of rules to the individual frames within the segment so as to determine the best frame. Any one or more rules may be applied depending upon the circumstances of the raw footage and/or according to a particular template desired by the user. Research by the present inventor has found that the best or optimal quality image of any one clip occurs in the third quarter of the clip. Further, within any one segment, the present inventor determined a best frame will be found in the middle of any one segment. Depending upon the duration of the segment, this can limit the number of individual frames to be further examined according to other rules.

Other selection rules may be based on various processes that can be applied to the frames that occur within the segment. One rule can include the audio analysis as indicated in FIG. 4 where a frame is selected as being substantially coincident with a peak in the audio track associated with the raw footage. Such a peak may include a crowd cheering at a sports event or a speaker talking at a conference.

Where multiple matches occur, user interface may be applied to resolve the issue to a single print frame. For example, each of the matching frames may be rendered onto the display 56 thereby permitting the user to select one frame for printing.

A further rule can include image analysis such a face detection whereby a print frame is selected based upon the detection of features indicative of a human face as opposed to background landscape information and the like. Face detection software and processes are known in the art and may be readily applied to the limited number of frames under consideration in step 258 of FIG. 12. Other selection criteria can include motion detection between adjacent frames whereby frames exhibiting substantial relative motion are excluded from selection as being likely to be subjected to poor quality recording such as lack of focus and the like.

Figure 7:
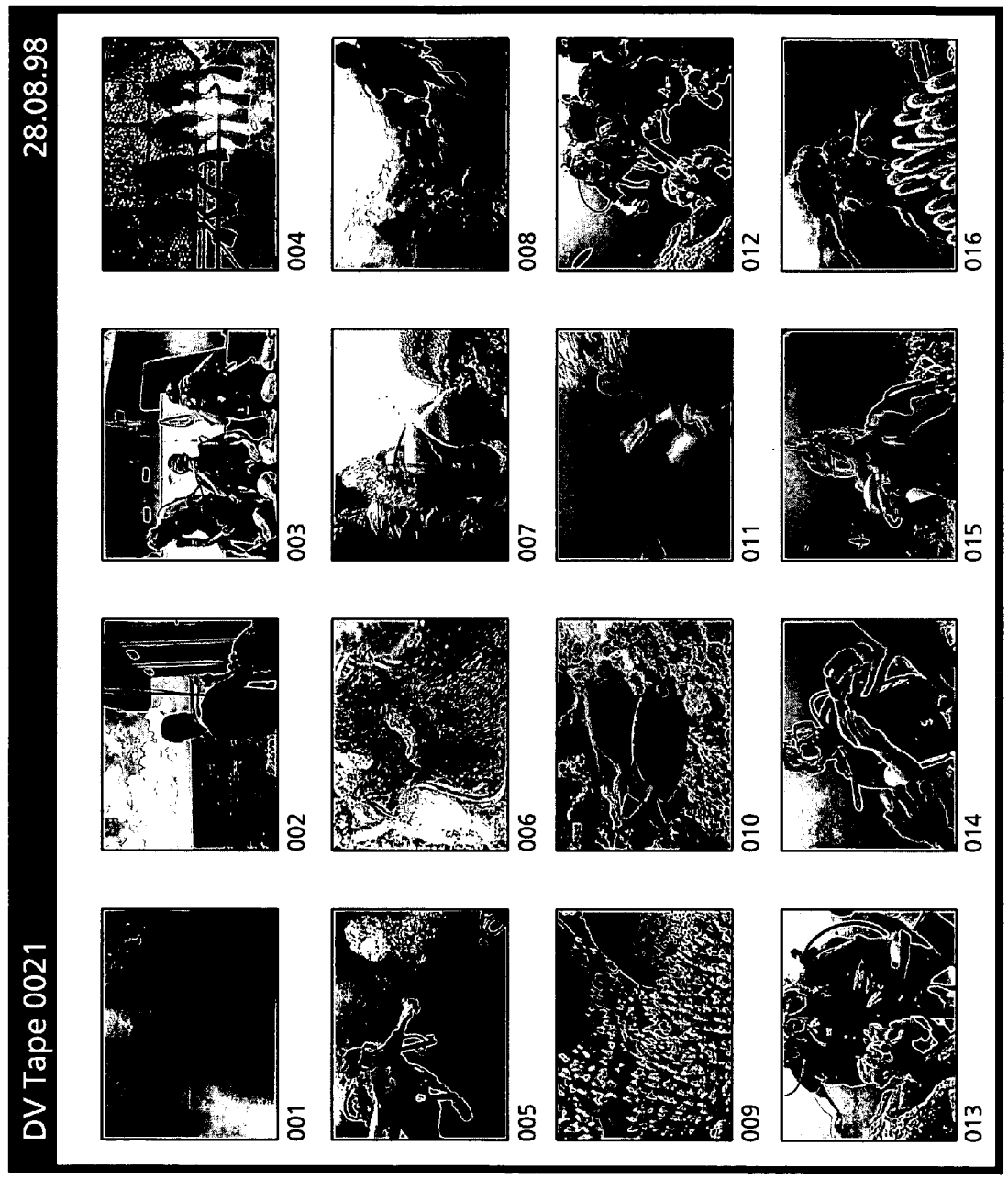
FIG. 7 depicts a video frame presentation sampled from the clip segmentation of FIG. 5.

An example of the formatted print output from the arrangement of FIGS. 5 and 12 is seen in FIG. 7, the subject matter of a diving excursion on the Great Barrier Reef. Twenty four individual print frame thumbnails are seen formatted on a single page with each being indicated of different stages of the diving excursion. For example, the first frame depicts the wake of the boat carrying the divers out onto the Reef with the next three frames indicating the divers preparing for the dive. The remaining frames indicate various samples taken from clips over the sequence of the dive.

It will be apparent from the foregoing that a number of arrangements are provided that allow for the editing of raw video footage and the like to provide useful versions thereof that are likely to encapsulate the subject matter of the original footage without representing a burden for any person wishing to view that footage. Rhythmic sequencing editing provides a convenient reduction in the size of the original footage in a fashion that provides a stylistic reproduction devised to enhance and maintain the interest of the viewer of the edited version. Rhythmic sequence editing also supports the combination of the original footage with over-dub audio and for pacing the footage and audio in substantial synchronism so as to maintain the interest of the audience. The provision of insert titles either with or without rhythmic sequence generation provides for identification of various scenes within the footage to be reproduced to convey a story line and the like to the audience. Print frame selection arrangement allows for a still image synopsis of the original video footage to be obtained and reproduced in a convenient fashion. Since each utilize different combinations of processes in their generation, there is no guarantee, where they are separately applied, that rhythmic sequence editing and print frame selection will result in reproduction of the same video frame in each output.

The foregoing describes only a number of embodiments of the present invention and modifications can be made thereto without departing from the scope of the present invention.

The invention claimed is:

1. A computer-implementable method of rhythmically editing an input video sequence to form an output edited sequence of shorter duration than the input video sequence without requiring a user to manually edit the input video sequence, the input video sequence comprising at least one input clip, each input clip being formed at least by video content captured between two points in time and thereby defining a duration of the input clip, the method comprising the steps of:

inputting the input video sequence into a computer to implement the method;

extracting duration data associated with the duration of each input clip of the input video sequence;

processing the duration data of the at least one input clip according to editing rules to form editing instruction data, the editing instruction data being configured to define output segments from the at least one input clip of the input video sequence, the editing rules indicating a sequence of the output segments and a plurality of predetermined segment durations including a first duration and a second duration, said processing of the duration data comprising:

(i) identifying, from the input video sequence, the sequence of the output segments, each of the output segment having one of the predetermined segment durations, and being derived from a single input clip of the input video sequence; and (ii) identifying, from the input video sequence, discardable portions each having at least a predetermined third duration, the discardable portions separating the segments of the rhythmic sequence, there being at least one discardable portion identified from each input clip of the input video sequence; and processing the at least one input clip of the input video sequence according to the editing instruction data to discard the discardable portions and to form the output edited sequence from the sequence of said segments.

2. A method according to claim 1, wherein the editing rules are contained in a user selectable template.

3. A method according to claim 1, wherein the first duration is between 1 and 8 seconds and the second duration is between 2 and 20 seconds.

4. A method according to claim 3, wherein the first duration is about 4 seconds and the second duration is about 10 seconds.

5. A method according to claim 1, wherein the output edited sequence is formed from a time sequential combination of the output segments based upon said rhythmic sequence according to the first duration and the second duration.

6. A method according to claim 5, wherein the rhythmic sequence comprises alternate first duration segments and second duration segments.

7. A method according to claim 1, wherein said discardable portions comprise an initial interval of a predetermined fourth duration identified from each input clip.

8. A method according to claim 7, wherein the fourth duration is between 0.5 and 2 seconds.

9. A method according to claim 1, wherein said discardable portions comprise an internal interval of a predetermined fifth duration identified from at least one input clip from which at least two of the output segments are to be formed, the internal interval separating portions of the input clip from which the at least two output segments are to be formed.

10. A method according to claim 9, wherein the fifth duration is between 1 and 5 seconds.

11. A method according to claim 1, wherein formation of the output segments comprises cutting a portion from at least one input clip and modifying a reproduction duration of the portion to correspond with one of the first duration and the second duration.

12. A method according to claim 11, wherein the cutting and the modifying are performed when the portion has a reproduction duration within a predetermined range of one of the first and second durations.

13. A method according to claim 12, wherein the predetermined range is from 70% to 200% of the one of the first and second durations.

14. A method according to claim 11, wherein the modifying comprises multiplying the reproduction duration of the portion by a predetermined factor and cutting the modified portion to one of the first and second durations.

15. A method according to claim 1, wherein the editing rules comprise an edited duration during which the output segments are to be reproduced and from which a number of the output segments is determined based upon the predetermined segment durations.

16. A method according to claim 1, wherein each of the plurality of predetermined segment durations is determined using a beat period of a sound track to be associated with the output edited sequence.

17. A method according to claim 1, wherein the duration data comprises data accompanying the video sequence.

18. A method according to claim 1, wherein the editing rules include incorporating at least one title matte as part of the output edited sequence.

19. A method according to claim 18, wherein the title matte is formed and incorporated according to a sub-method comprising the steps of:
examining time data associated with the duration data for each input clip to identify input clips that are associable by a predetermined time function, the associable input clips being arranged into corresponding groups of input clips;
identifying at least one of a beginning and a conclusion of each group as a title location;
for at least one title location, examining at least one of corresponding time data and further data to generate an insert title including at least a text component; and
incorporating the insert title into the output edited sequence at a corresponding title location.

20. A method according to claim 1, wherein the template is selected from a plurality of templates each comprising different combinations of said editing rules.

21. A method according to claim 1, wherein the first duration and the second duration are selected from one of:
(i) about 4 seconds and about 12 seconds respectively;
(ii) about 6 seconds and about 12 seconds respectively;
(iii) about 3 seconds and about 8 seconds respectively;
(iv) about 1 second and about 1 second respectively; and
(v) about 3 seconds and about 3 seconds respectively.

22. A computer readable medium selected from one of a hard drive, a semiconductor memory, a CD-ROM, and a floppy disk, and encoded with a computer program, wherein the program is configured to make a computer execute a method of rhythmically editing an input video sequence to form an output edited sequence of shorter duration than the input video sequence, the input video sequence comprising at least one input clip, each input clip being formed at least by video content captured between two points in time and thereby defining a duration of the input clip, the method comprising the steps of:
inputting the input video sequence;
extracting duration data associated with the duration of each input clip of the input video sequence;
processing the duration data of the at least one input clip according to editing rules to form editing instruction data, the editing instruction data being configured to define output segments from the at least one input clip, the editing rules indicating a sequence of the output segments and a plurality of predetermined segment durations including a first duration and a second duration, said processing comprising:
(i) identifying, from the input video sequence, the sequence of the output segments, each of the output segments having one of the predetermined segment durations, and being derived from a single input clip of the input video sequence; and
(ii) identifying, from the input video sequence, discardable portions each having at least a predetermined third duration, the discardable portions separating the segments of the sequence, there being at least one discardable portion identified from each input clip of the input video sequence; and
processing the at least one input clip of the input video sequence according to the editing instruction data to discard the discardable portions and to form the output edited sequence from the sequence of said segments.

23. A computer readable medium according to claim 22, wherein the editing rules are contained in a user selectable template.

24. A computer readable medium according to claim 22, wherein the first duration is between 1 and 8 seconds, the second duration is between 2 and 20 seconds, and a discardable portion associated with each said input clip comprises an initial portion of the input clip having a duration between 0.5 and 2 seconds.

25. A computer readable medium according to claim 22, wherein said discardable portions comprise an internal interval of a predetermined (fourth) duration identified from at least one input clip from which at least two of the output segments are to be formed, the internal interval separating portions of the input clip from which the at least two output segments are to be formed, the fourth duration being between 1 and 5 seconds.

26. A computer readable medium according to claim 22, wherein formation of the output segments comprises cutting a portion from at least one input clip and modifying a reproduction duration of the portion to correspond with one of the first duration and the second duration.

27. A computer readable medium according to claim 26, wherein the cutting and the modifying are performed when the portion has a reproduction duration within a predetermined range of one of the first and second durations, the predetermined range being from 70% to 200% of the one of the first and second durations.

28. A computer readable medium according to claim 26, wherein the modifying comprises expanding the reproduction duration of the portion by a predetermined factor and cutting the modified portion to one of the first and second durations.

29. A computer readable medium according to claim 22, wherein the editing rules comprise an edited duration during which the output segments are to be reproduced and from which a number of the output segments is determined based upon the plurality of predetermined segment durations.

30. A computer readable medium according to claim 22, wherein the output edited sequence is formed from a time sequential combination of the output segments based upon a predetermined cutting pattern formed using segments of the first duration and the second duration, the sequence comprising one of (a) alternate first duration segments and second duration segments and (b) a pseudo-random selection of first duration segments and second duration segments.

31. A computer readable medium according to claim 22, wherein each of the plurality of predetermined segment durations is determined using a beat period of a sound track to be associated with the output edited sequence.

32. A computer readable medium according to claim 22, wherein the duration data comprises data selected from the group consisting of:
    data accompanying the input video sequence; and
    data formed by analyzing the input video sequence, the analyzing comprising at least one of time analysis, image analysis, sound analysis, and motion analysis.

33. A computer readable medium according to claim 22, wherein the editing rules include incorporating at least one title matte as part of the output edited sequence, the title matte being formed and incorporated according to a sub method comprising the steps of:
    examining time data associated with the duration data for each input clip to identify those of the input clips that are associable by a predetermined time function, the associable input clips being arranged into corresponding groups of input clips;
    identifying at least one of a beginning and a conclusion of each group as a title location;
    for at least one title location, examining at least one of corresponding time data and further data to generate an insert title including at least a text component; and
    incorporating the insert title into the output edited sequence at the title location.

34. A visual image rhythmic editing system for editing an input video sequence to form an output edited sequence of shorter duration than the input video sequence without requiring a user to manually edit the input video sequence, said system comprising:
    supply means for providing the input video sequence, the input video sequence comprising at least one input clip, each input clip being formed at least by video content captured between two points in time and thereby defining a duration of the input clip;
    extracting means for extracting duration data associated with the duration of each input clip of the input video sequence;
    processing means for processing the duration data of the at least one input clip according to editing rules to form editing instruction data, the editing instruction data being configured to define output segments from the at least one input clip, the editing rules indicating a sequence of the output segments and a plurality of predetermined segment durations including a first duration and a second duration, the processing means being operative to (i) identify, from the input video sequence, the sequence of the output segments, each of the output segments having one of the predetermined segment durations, and being derived from a single input clip of the input video sequence, and (ii) identify, from the input video sequence, discardable portions each having at least a predetermined third duration, the discardable portions separating the segments of the sequence, there being at least one discardable portion identified from each input clip of the input video sequence;
    editing means for editing the at least one input clip of the input video sequence according to the editing instruction data to discard the discardable portions and to form the output edited sequence from the sequence of said segments; and
    output means for outputting the output edited sequence.

35. A system according to claim 34, wherein the supply means comprises a storage arrangement configured to couple the input video sequence to the extracting means, and the output means comprises at least one of a display device by which the output edited sequence is viewable and a further storage arrangement for storing the output edited sequence.

36. A system according to claim 34, wherein the duration data comprises metadata, the extracting means forming a metadata file of the input video sequence based upon each input clip, and the metadata file forming an input to the processing means, and wherein at least the processing means comprises a computer device operable to interpret the metadata file according to the editing rules to form the editing instruction data.

37. A system according to claim 34, wherein the first duration is between 1 and 8 seconds, the second duration is between 2 and 20 seconds, and the discardable portions comprise (a) an initial interval of each input clip of between 0.5 and 2 seconds, and (b) an internal interval of a predetermined (fourth) duration identified from at least one input clip from which at least two of the output segments are to be formed, the internal interval separating portions of the input clip from which the at least two output segments are to be formed, the fourth duration being between 1 and 5 seconds.

38. A system according to claim 34, wherein the editing means comprises means for cutting a portion from at least one input clip and modifying a reproduction duration of the portion to correspond with one of the first duration and the second duration.

39. A system according to claim 38, wherein the cutting and the modifying are performed when the portion has a reproduction duration within a predetermined range of one of the first and second durations, the predetermined range being from 70% to 200% of the one of the first and second durations.

40. A system according to claim 38, wherein the modifying comprises expanding the reproduction duration of the portion by a predetermined factor and cutting the modified portion to one of the first and second durations.

41. A system according to claim 34, wherein said processing means comprises a store of said editing rules, one of said rules comprising an edited duration during which the output segments are to be reproduced and from which the processing means is configured to determine a number of the output segments based upon the first and second durations.

42. A system according to claim 34, wherein the editing means forms the output edited sequence from a time sequential combination of the segments based upon a predetermined cutting pattern formed using segments of the first duration and the second duration.

43. A system according to claim 42, wherein the sequence comprises one of (a) alternate first duration segments and second duration segments and (b) a pseudo random selection of first duration segments and second duration segments.

44. A system according to claim 34, wherein the editing rules comprise incorporating at least one title matte as part of the output edited sequence, and wherein the system further comprises means for forming and incorporating the title matte into the output edited sequence, the means for forming and incorporating comprising:

associating means for examining time data associated with the duration data for each input clip to identify input clips that are associable by a predetermined time function, the associable input clips being arranged into corresponding groups of input clips;

identifying means for identifying at least one of a beginning and a conclusion of each group as a title location;

data examining means for examining, for at least one title location, at least one of corresponding time data and further data to generate an insert title including at least a text component; and means for incorporating the insert title into the output edited sequence at a corresponding title location.

45. A method of editing an input video sequence comprising a plurality of individual input clips to form an output edit sequence, each input clip being formed by video content captured between a corresponding commencement of recording and a corresponding cessation of recording and distinguished by associated data including at least time data related to a real time at which the input clip was recorded, the method comprising the steps of:

(a) (a1) examining the time data for each input clip to identify input clips that are associable by a predetermined time function, the associable input clips being arranged into corresponding groups of input clips, and duration data for each input clip;

(a2) providing at least one predetermined template of editing rules, the template having at least a plurality of predetermined segment durations and indicating a sequence of output segments;

(a3) processing the duration data of the at least one input clip according to the editing rules of the template to form editing instruction data, the editing instruction data being configured to define the output segments from the at least one input clip, said processing comprising (i) identifying, from the input video sequence, the sequence of said segments, each said segment of the sequence having one of the predetermined segment durations, and being derived from a single input clip of the input video sequence; and (ii) identifying from the input video sequence, discardable portions each having at least a predetermined discardable duration, the discardable portions separating the segments of the sequence of segments, there being at least one discardable portion identified from each input clip of the input video sequence; and (a4) processing the at least one input clip of the input video sequence according to the editing instruction data to discard the discardable portions and to form the output edited sequence from the segments;

(b) for each group of input clips, identifying from corresponding time data at least one of a beginning and a conclusion of the group as a title location;

(c) for at least one title location, examining at least one of corresponding time data and further data to generate an insert title including at least a text component; and (d) incorporating the insert title into the output video sequence at a corresponding title location.

46. A method according to claim 45, wherein the predetermined time function comprises associating any two sequential input clips within a group when a period between a real-time conclusion of one of the sequential input clips and the real time commencement of a following input clip is less than a predetermined (first) duration.

47. A method according to claim 45, wherein the further data comprises user provided data.

48. A method according to claim 45, wherein the further data comprises generated data formed by analyzing a corresponding input clip, and step (c) comprises examining at least one of the time data and the further data to select from a rule based group of alternatives at least one title component from a title database, the at least one title component collectively forming the insert title.

49. A method according to claim 48, wherein the at least one title component is selected from the group consisting of individual words and phrases, the at least one title component being configured for selection in response to a rule based examination of at least one of the time data and the further data.

50. A method according to claim 49, wherein the title database comprises a plurality of typeset configurations applicable to the at least one title component to modify a visual impact of the insert title.

51. A method according to claim 48, wherein the title database comprises a graphical database of graphical objects configured for inclusion in the insert title.

52. A method according to claim 45, wherein the insert title comprises a matte background permitting superimposition of the insert title upon a clip.

53. A computer readable medium, selected from one of a hard drive, a semiconductor memory, a CD-ROM, and a floppy disk, and encoded with a computer program, wherein the program is configured to make a computer execute a method of editing an input video sequence comprising a plurality of individual input clips to form an output edited sequence, each input clip being formed by video content captured between a corresponding commencement of recording and a corresponding cessation of recording and distinguished by associated data including at least time data related to a real time at which the clip was recorded, the method comprising the steps of:

(a) (a1) examining the time data for each input clip to identify input clips that are associable by a predetermined time function, the associable input clips being arranged into corresponding groups of input clips, and duration data for each input clip;

(a2) providing at least one predetermined template of editing rules, the template having at least a plurality of predetermined segment durations and indicating a sequence of output segments and a plurality of predetermined segment durations including a first duration and a second duration;

(a3) processing the duration data of the at least one input clip according to the editing rules of the template to form editing instruction data, the editing instruction data being configured to define the output segments from the at least one input clip, said processing comprising (i) identifying, from the input video sequence, the sequence of said segments, each said segment of the sequence having one of the predetermined segment durations, and being derived from a single input clip of the input video sequence, and (ii) identifying, from the input video sequence, discardable portions each having at least a predetermined discardable duration, the discardable portions separating the segments of the sequence of segments, there being at least one discardable portion identified from each input clip of the input video sequence; and (a4) processing the at least one input clip of the video sequence according to the editing instruction data to discard the discardable portions and to form the output edited sequence from the segments;

(b) for each group of input clips, identifying from corresponding time data at least one of a beginning and a conclusion of the group as a title location;

(c) for at least one title location, examining at least one of corresponding time data and further data to generate an insert title including at least a text component; and (d) incorporating the insert title into the video sequence at a corresponding title location.

54. A computer readable medium according to claim 53, wherein the predetermined time function comprises associating any two sequential input clips within a group when a period between a real-time conclusion of one of the sequential input clips and a real-time commencement of a following clip is less than a predetermined (first) duration.

55. A method according to claim 53, wherein the further data comprises user provided data.

56. A computer readable medium according to claim 53, wherein the further data comprises generated data formed by analyzing a corresponding input clip, and step (c) comprises examining at least one of the time data and the further data to select from a rule-based group of alternatives at least one title component from a title database, the at least one title component collectively forming the insert title.

57. A computer readable medium according to claim 56, wherein the at least one title component is selected from the group consisting of individual words and phrases, the at least one title component being configured for selection in response to a rule based examination of at least one of the time data the further data.

58. A computer readable medium according to claim 57, wherein the title database comprises a plurality of typeset configurations applicable to the at least one title component to modify a visual impact of the insert title.

59. A computer readable medium according to claim 56, wherein the title database comprises a graphical database of graphical objects configured for inclusion in the insert title.

60. A computer readable medium according to claim 53, wherein the insert title comprises a matte background permitting superimposition of the insert title upon an output segment.

61. A system for editing an input video sequence comprising a plurality of individual input clips to form an output edited sequence, each input clip being formed by video content captured between a corresponding commencement of recording and a corresponding cessation of recording and distinguished by associated data including at least time data related to a real time at which the input clip was recorded, the system comprising:

associating means for examining the time data for each input clip to identify input clips that are associable by a predetermined time function, and for arranging associable input clips into corresponding groups of clips, and duration data for each input clip;

at least one predetermined template of editing rules, the template having at least a plurality of predetermined segment durations including a first duration and a second duration and indicating a sequence of output segments;

processing means for processing the duration data of the at least one input clip according to the editing rules of a selected said template to form editing instruction data, the editing instruction data being configured to define the output segments from the at least one input clip, the processing comprising (i) identifying, from the input video sequence, the sequence of said segments, each said segment of the sequence having one of the predetermined segment durations, and being derived from a single input clip of the input video sequence, and (ii) identifying, from the input video sequence, discardable portions each having at least a predetermined third duration, the discardable portions separating the segments of the rhythmic sequence, there being at least one discardable portion identified from each input clip of the input video sequence;

cutting means for cutting the at least one input clip of the input video sequence according to the edit instruction data to discard the discardable portions and to form the output edited sequence from the output segments;

identifying means for, for each group of input clips, identifying from corresponding time data at least one of a beginning and a conclusion of the group as a title location;

examining means for examining, for at least one title location, at least one of corresponding time data and further data to generate an insert title including at least a text component; and editing means for incorporating the insert title into the output segments at a corresponding title location to form the output edited sequence.

62. A system according to claim 61, wherein input clips within each group are sequentially associable by the predetermined time function, and the predetermined time function comprises associating any two sequential input clips within a group when a period between a real-time conclusion of one clip and real-time commencement of a following input clip is less than a predetermined (fourth) duration.

63. A system according to claim 61, wherein the further data comprises user provided data.

64. A system according to claim 61, wherein the further data comprises generated data formed by analyzing a corresponding input clip, and wherein the examining means examines at least one of the time data and the further data to select from a rule-based group of alternatives at least one title component from a title database, the at least one title component collectively forming the insert title.

65. A system according to claim 64, wherein the at least one title component is selected from the group consisting of individual words and phrases, the at least one title component being configured for selection in response to a rule-based examination of at least one of the time data and the further data.

66. A system according to claim 65, wherein the title database comprises a plurality of typeset configurations applicable to the at least one title component to modify a visual impact of the insert title.

67. A system according to claim 64, wherein the title database comprises a graphical database of graphical objects configured for inclusion in the insert title.

68. A system according to claim 61, wherein the insert title comprises a matte background permitting superimposition of the insert title upon an output segment.

69. A computer-implementable method of editing an input video sequence, the video sequence comprising at least one clip, each clip being formed at least by video content captured between two points in time and thereby defining a duration of the clip, the method comprising the steps of:

extracting duration data associated with the duration of each clip of the video sequence;

providing at least one predetermined template, the template having a plurality of attributes including cutting rules comprising at least a first edited segment duration, having a predetermined duration between 1 and 8 seconds, and a second edited segment duration, having a predetermined duration between 2 and 20 seconds;

processing the duration data of the at least one clip according to the cutting rules of the template to form editing instruction data, the editing instruction data being configured to form output edited segments from the at least one clip; and processing the at least one clip of the video sequence according to the editing instruction data to form an output edited sequence of the output edited segments, each output edited segment having a duration corresponding to one of the edited segment durations of the cutting rules of the template, with at least a portion of the at least one clip being discarded by the processing of the at least one clip.

70. A computer-implementable method of rhythmically editing an input video sequence to form an output edited sequence of shorter duration than the input video sequence without requiring a user to manually edit the input video sequence, the input video sequence comprising at least one input clip, each input clip being formed at least by video content captured between two points in time and thereby defining a duration of the input clip, the method comprising the steps of:

inputting the input video sequence into a computer to implement the method;

extracting duration data associated with the duration of each input clip of the input video sequence; and processing the duration data of the at least one input clip according to rhythmic editing rules to form editing instruction data, the rules including at least a user selectable reproduction duration for the output edited sequence and a plurality of editing durations including a first duration and a second duration, the editing instruction data being configured to define output segments from the at least one input clip of the input video sequence, said processing of the duration data comprising:

(i) determining from the reproduction duration at least the first editing duration for defining output segments from the at least one input clip and a number of said output segments of the first editing duration to occupy the reproduction duration;

(ii) identifying, from the input video sequence, a sequence of said number of said output segments, each said output segment being derived from a single input clip of the input video sequence; and (iii) identifying discardable portions from the input video sequence, the discardable portions having at least the second duration and separating the output segments of the rhythmic sequence, there being at least one discardable portion identified from each input clip of the input video sequence; and processing the at least one input clip of the input video sequence according to the editing instruction data to discard the discardable portions and to form the output edited sequence from the sequence of said output segments.

71. A method according to claim 70, wherein the edited segments of the first duration are compressed in time so that the output edited sequence occupies the reproduction duration.

* * * * *

UNITED STATES PATENT AND TRADEMARK OFFICE
CERTIFICATE OF CORRECTION

PATENT NO. : 7,362,946 B1
APPLICATION NO. : 09/543330
DATED : April 22, 2008
INVENTOR(S) : Julie Rae Kowald Page 1 of 1

It is certified that error appears in the above-identified patent and that said Letters Patent is hereby corrected as shown below:

COLUMN 18
Line 59, "10am," should read --10 am,--.

COLUMN 21
Line 39, "Reef" should read --reef--.

COLUMN 29
Line 31, "data" (first occurrence) should read --data and--.

Signed and Sealed this

Twenty-seventh Day of January, 2009

JOHN DOLL
*Acting Director of the United States Patent and Trademark Office*